US011831508B2

(12) United States Patent
Hill et al.

(10) Patent No.: US 11,831,508 B2
(45) Date of Patent: Nov. 28, 2023

(54) TECHNIQUES FOR DYNAMIC CONFIGURATION GENERATION

(71) Applicant: Oracle International Corporation, Redwood Shores, CA (US)

(72) Inventors: Peter John Hill, Seattle, WA (US); Jincheng Liu, Seattle, WA (US); Zhao Wang, Brier, WA (US); Pingbo Zhang, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 17/107,422

(22) Filed: Nov. 30, 2020

(65) Prior Publication Data

US 2022/0173966 A1   Jun. 2, 2022

(51) Int. Cl.
*H04L 41/0873* (2022.01)
*H04L 41/0816* (2022.01)
*H04L 67/10* (2022.01)

(52) U.S. Cl.
CPC ...... *H04L 41/0873* (2013.01); *H04L 41/0816* (2013.01); *H04L 67/10* (2013.01)

(58) Field of Classification Search
CPC .. H04L 41/0873; H04L 67/10; H04L 41/0816
See application file for complete search history.

(56) References Cited

U.S. PATENT DOCUMENTS

| 9,319,300 | B2* | 4/2016 | Huynh Van | H04L 41/14 |
| 2014/0072115 | A1* | 3/2014 | Makagon | H04M 3/5183 |
| | | | | 379/265.09 |

(Continued)

OTHER PUBLICATIONS

"Download VPN Device Configuration Scripts for S2S Vpn connections", Microsoft Azure, Sep. 2, 2020, https://docs.microsoft.com/en-us/azure/vpn-gateway/vpn-gateway-download-vpndevicescript, 7 pages.

(Continued)

*Primary Examiner* — Hua Fan
(74) *Attorney, Agent, or Firm* — Kilpatrick Townsend & Stockton LLP

(57) ABSTRACT

A configuration helper system (CHS) is described that simplifies the task of generating configuration information for a customer premises equipment (CPE) in a customer's on-premise network to enable the CPE to communicate with the customer's cloud network over a particular communication channel. The CHS is configured to generate configuration information that is customized for the particular CPE and communication channel. Given information about the CPE and the communication channel, the CHS automatically identifies a particular set of configuration parameters to be included in the customized configuration information and determines values for the set of parameters, where some of the values may be provided by the customer. A particular CPE-specific format is determined for the configuration information. Customized configuration information for the CPE is then generated in the determined format, where the generated configuration information includes the set of parameters and their values, and potentially other CPE-specific information.

19 Claims, 12 Drawing Sheets

(56) References Cited

U.S. PATENT DOCUMENTS

2014/0365020 A1* 12/2014 Brusilovsky ....... G05B 19/0426
700/282
2019/0146782 A1* 5/2019 Storz ........................ G06F 8/71
717/121
2020/0092253 A1* 3/2020 Gray .................. H04L 41/5003

OTHER PUBLICATIONS

About VPN devices and IPsec/IKE parameters for Site-to-Site VPN Gateway connections, Microsoft Azure, Sep. 1, 2020, https://docs.microsoft.com/en-us/azure/vpn-gateway/vpn-gateway-about-vpn-devices#configscripts, 12 pages.

"Tutorial: Create a Site-to-Site connection using Azure Virtual WAN" Microsoft Azure, Oct. 8, 2020 https://docs.microsoft.com/en-us/azure/virtual-wan/virtual-wan-site-to-site-portal, 19 pages.

"Your customer gateway device", AWS Site-to-Site VPN, downloaded from URL on Dec. 2, 2020, https://docs.aws.amazon.com/vpn/latest/s2svpn/your-cgw.html, 8 pages.

"AWS Site-to-Site VPN—User Guide" AWS, Copyright 2020, downloaded on Dec. 1, 2020, 148 pages.

* cited by examiner

TECHNIQUES FOR DYNAMIC CONFIGURATION GENERATION

BACKGROUND

The demand for cloud-based services continues to increase rapidly. The term cloud service is generally used to refer to a service that is made available by a cloud services provider to users or customers on demand (e.g., via a subscription model) using systems and infrastructure (cloud infrastructure) provided by the cloud services provider. Typically, the servers and systems that make up the cloud service provider's infrastructure are separate from the customer's own on-premise servers and systems. Customers can thus avail themselves of cloud services provided by a cloud service provider without having to purchase separate hardware and software resources for the services. There are various different types or models of cloud services including Software-as-a-Service (SaaS), Platform-as-a-Service (PaaS), Infrastructure-as-a-Service (IaaS), and others.

In an IaaS model, the cloud services provider provides infrastructure resources (e.g., compute resources, memory resources, networking resources, such as servers, storage devices, etc.) that can be used by customers to build their own resources and virtual networks. The infrastructure provided by the IaaS cloud service provider comprising interconnected high-performance computer, memory, and network resources or components forms a physical network (also referred to as a substrate network or underlay network). The physical network provides the underlying basis for creating customers' virtual networks (also referred to as overlay networks) on top of the physical network. The cloud service provider generally provides a wide range of applications, services, and APIs that enable customers (e.g., enterprises) to efficiently build these virtual networks, and deploy and manage various virtual workloads (e.g., virtual machines, containers, applications) in these virtual networks in a highly available distributed environment. Customers can generally manage their cloud-based workloads in the same way they manage their on-premises workloads and get all benefits of the high-performance computing and network capabilities with the same control, isolation, security, and predictable performance as their on-premises network. The high-level APIs provided by the IaaS cloud services provider are used to dereference various low-level details of underlying network infrastructure like physical computing, resources, location, data partitioning, scaling, security, backup and so on.

Customers generally have one or more customer on-premise networks and one or more virtual networks deployed in the cloud using infrastructure provided by the cloud service provider. Various different communication mechanisms may be provided that enable a customer's on-premise network to communicate with the customer's virtual cloud network. In order to set up such communications, devices or equipment in the customer's on-premise network have to be configured properly to be able to participate in these communications. For example, the customer premises equipment (CPE) that is to be one end point of the communication channel between the customer's on-premise network and the customer's cloud network needs to be properly configured. However, this configuration can be quite complex and time consuming. Many times, the user, such as a system administrator or network engineer, on the customer's side does not have sufficient knowledge or training to configure the CPEs properly. This is because the configuration requires configuration information that is not only specific to the customer and the CPE, but also configuration information that is specific to the cloud provider. The problem is further aggravated because the CPEs can be from different vendors. These various vendors could provide different CPE platforms. Further, there could be different versions of platforms, each with their own unique configuration requirements. Configuring a CPE in a customer's on-premise network is thus a non-trivial task and the effects of an incorrect configuration can be very detrimental to the customer.

BRIEF SUMMARY

The present disclosure describes techniques for configuring devices. More particularly, techniques are described for simplifying the task of generating configuration information for a customer premises equipment (CPE) in a customer's on-premise network to enable the CPE to communicate with the customer's cloud network. Techniques are provided (e.g., a method, a system, non-transitory computer-readable medium storing code or instructions executable by one or more processors) for enabling automatic generation of configuration information (e.g., in the form of a configuration file) that can be easily applied to the customer's CPE to enable the CPE to establish a connection and communicate with the customer's network in the cloud. Various aspects are described herein, including methods, systems, non-transitory computer-readable storage media storing programs, code, or instructions executable by one or more processors, and the like.

In one example, a configuration helper system (CHS) is provided that simplifies the task of generating configuration information for a customer premises equipment (CPE) in a customer's on-premise network to enable the CPE to communicate with the customer's cloud network over a particular communication channel. The CHS is configured to generate configuration information that is customized for the particular CPE and communication channel. Given information about the CPE and the communication channel, the CHS automatically identifies a particular set of configuration parameters to be included in the customized configuration information and determines values for the set of parameters, where some of the values may be provided by the customer. A particular CPE-specific format is determined for the configuration information. Customized configuration information for the CPE is then generated in the determined format, where the generated configuration information includes the set of parameters and their values, and potentially other CPE-specific information.

In certain embodiments, responsive to a request to generate configuration information for a customer premise equipment (CPE) located in an on-premise network to enable establishment of a communication channel between the CPE and a network hosted by infrastructure provided by a cloud services provider, a configuration helper system (CHS) identifies, based upon information included in the request identifying the CPE, a set of parameters to be included in the configuration information to be generated for the CPE. A set of values are determined for the set of parameters. In certain embodiments, as part of determining the set of values, the CHS performs processing including identifying a subset of parameters from the set of parameters; communicating, to a first system, information identifying the subset of parameters; and receiving, from the first system, a set of one or more values for one or more parameters in the subset of parameters. The CHS determines a format specific to the CPE. The CHS then generates the configuration information for the CPE in the format specific to the CPE, where the generated configuration information comprises information including the set of parameters and the set of values determined for the set of parameters.

In certain embodiments, the CHS may communicate the generated configuration information to the first system. In other embodiments, the configuration information may be communicated to an on-premise network where the configuration information may be applied to the CPE.

In some embodiments, the CHS may determine additional information to be included in the configuration information to be generated for the CPE, wherein the additional information includes one or more commands to be executed at the CPE. In such an embodiment, the configuration information that is generated comprises the additional information. The additional information may also include help information and explanations related to the configuration information, to help an administrator of the CPE.

In certain embodiments, the CHS may determine a first value for a first parameter in the subset of parameters, and communicate the determined first value to the first system. The first value may be determined using various different techniques. For example, according to one technique, the CHS may determine first value from preferences information for a customer, where the on-premise network is a network of that customer. According to another technique, the CHS may determine the first value based upon one or more prior values set for the first parameter. In some embodiments, the CHS may receive a second value for the first parameter from the first system, where the second value is different from the first value. When the CHS generates the configuration information for the CPE, the configuration information includes the second value for the first parameter instead of the first value.

In certain embodiments, the information received by the CHS in the request to generate configuration information for the CPE includes information identifying the communication channel, and information identifying the CPE, where the information identifying the CPE may include at least one of information identifying a vendor of the CPE, information identifying a version of the CPE, or information identifying a platform of the CPE. The CHS then identifies the set of parameters to be included in the configuration information to be generated for the CPE based upon the information identifying the communication channel and information identifying the CPE.

The foregoing, together with other features and aspects will become more apparent upon referring to the following specification, claims, and accompanying drawings.

DETAILED DESCRIPTION

In the following description, for the purposes of explanation, specific details are set forth in order to provide a thorough understanding of certain aspects. However, it will be apparent that various aspects may be practiced without these specific details. The figures and description are not intended to be restrictive. The word "exemplary" is used herein to mean "serving as an example, instance, or illustration." Any aspect or design described herein as "exemplary" is not necessarily to be construed as preferred or advantageous over other aspects or designs.

The present disclosure describes techniques for configuring devices. More particularly, techniques are described for simplifying the task of generating configuration information for a customer premises equipment (CPE) in a customer's on-premise network to enable the CPE to communicate with the customer's cloud network. A configuration helper system (CHS) is disclosed that is configured to generate configuration information that is customized for a particular CPE. Given information identifying the particular CPE and the particular communication channel to be established between a customer on-premise network and a customer network hosted in the cloud, the CHS is capable of identifying the particular set of configuration parameters that are to be included in the configuration information for the particular CPE, determining the values for the set of parameters, determining any additional information to be included in the configuration information, determining a format for the configuration information, and then generating the configuration information for the particular CPE. The generated configuration information can then be communicated to the customer so that the customer can apply the configuration information to the CPE. In certain embodiments, the generated information may be communicated to the customer on-premise network. In yet other embodiments, as permitted by the customer, the generated configuration information may be applied to the CPE.

Figure 1:
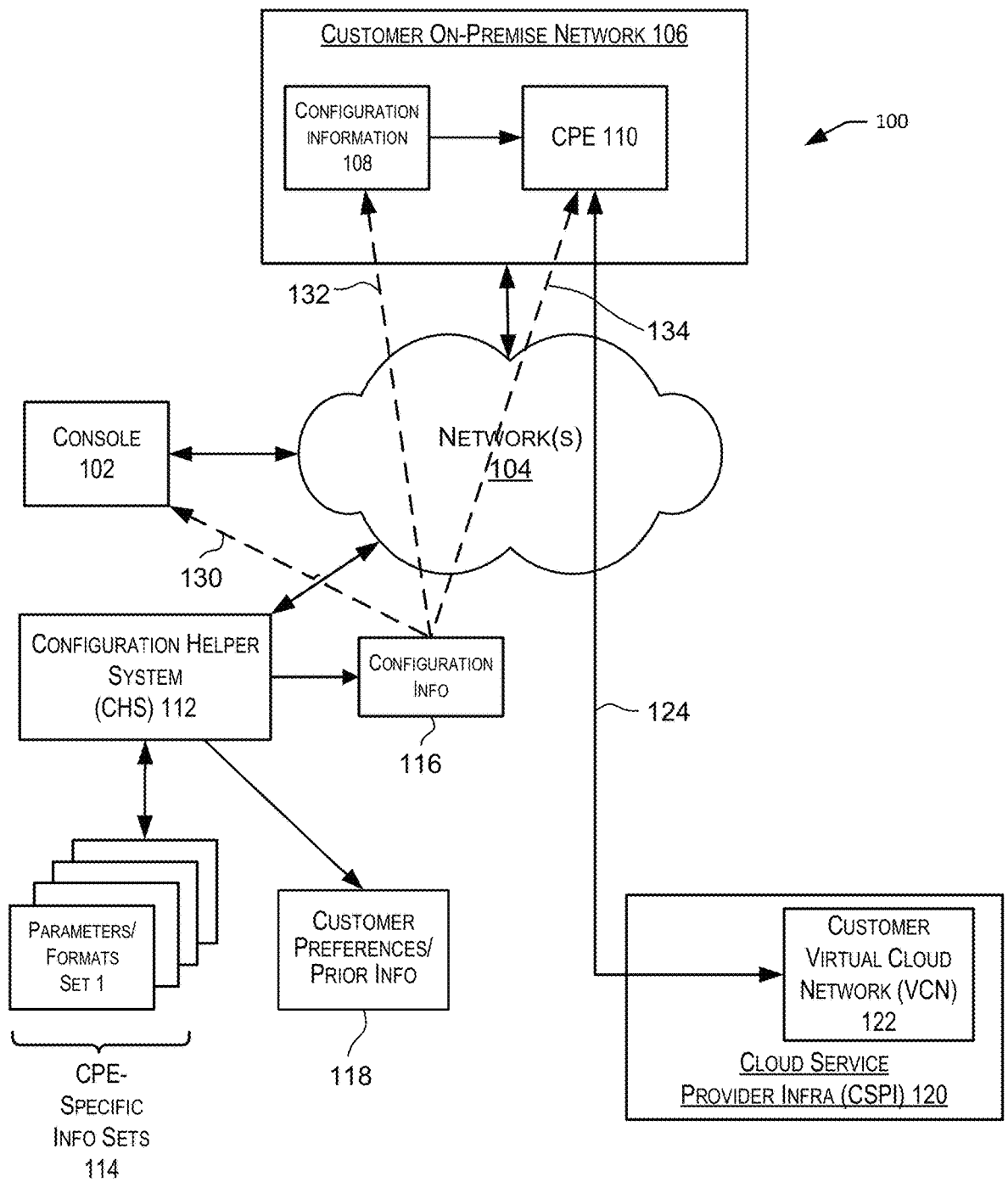
FIG. 1 depicts a distributed environment including a configuration helper system (CHS) that is configured to facilitate generation of configuration information for configuring a customer premise equipment (CPE) according to certain embodiments.

FIG. 1 depicts a distributed environment 100 including a configuration helper system (CHS) that is configured to facilitate generation of configuration information for configuring a customer premise equipment (CPE) according to certain embodiments. Distributed environment 100 may comprise multiple systems communicatively coupled to each other via one or more communication networks 104. For example, the embodiment in FIG. 1 depicts various systems and networks including a customer on-premise network 106, a console 102, a configuration helper system (CHS) 112, and cloud service provider infrastructure (CSPI) 120. These various systems and networks may be communicatively coupled with each other via communication network 104. The distributed environment 100 depicted in FIG. 1 is merely an example and is not intended to unduly limit the scope of claimed embodiments. Many variations, alternatives, and modifications are possible. For example, in some implementations, the distributed environment 100 may have more or fewer systems or components than those shown in FIG. 1, may combine two or more systems, or may have a different configuration or arrangement of systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Communication network 104 facilitates communications between the various systems and networks depicted in FIG. 1. The communication network 104 can be of various types and can include one or more communication networks. Examples of communication network 104 include, without restriction, a public network such as the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 104 may include any infrastructure that facilitates communications between the various systems depicted in FIG. 1.

As shown in the embodiment depicted in FIG. 1, the distributed environment 100 includes cloud services provider infrastructure (CSPI) 120 that is provided by a cloud service provider (CSP) and used to provide one or more cloud services. A customer can subscribe to one or more of these cloud services provided by the CSP using CSPI 120. A customer is any entity that subscribes to a cloud service provided by the CSP. A customer can subscribe to one or more cloud services including services of different types including SaaS, PaaS, IaaS, and other types of cloud services. When a customer subscribes to or registers for a service provided by a CSP, a tenancy or an account is created for that customer. The customer has access to this account and can use it to access cloud resources associated with the account.

In certain embodiments, a CSP may provide services under an IaaS model, wherein the CSP provides infrastructure, such as CSPI 120, that can be used by customers to build their own networks and deploy customer resources. In such embodiments, CSPI 120 may include interconnected high-performance compute resources including various host machines, memory resources, and network resources that form a physical network, which is referred to as a substrate network or an underlay network. CSPI 120 can include one or more computing systems. The resources in CSPI 120 may be spread across one or more data centers that may be geographically spread across one or more regions. The physical network provides the underlying basis for creating one or more virtual or overlay networks on top of the physical network. These virtual or overlay networks (also referred to as software-based or -defined networks) are implemented using software virtualization technologies to create layers of network abstraction that can be run on top of the physical network. Overlay networks can take on many forms. Overlay networks typically use Layer-3 IP addressing with endpoints designated by their virtual IP addresses. This method of overlay networking is often referred to as virtual Layer 3 networking. When a customer subscribes to or registers for an IaaS service provided by a CSP, the tenancy created for that customer is a secure and isolated partition within CSPI 120 where the customer can create, organize, and administer their cloud resources.

A customer can build networks using resources provided by CSPI 120. One or more customer resources, such as compute instances, can be deployed on these networks. For example, a customer can use resources provided by CSPI 120 to build one or multiple customizable and private networks, referred to as virtual cloud networks or VCNs. For example, as depicted in FIG. 1, a customer has configured a customer VCN 122 using resources provided by CSPI 120. A customer can deploy one or more customer resources, such as compute instances, on these customer VCNs. Compute instances can take the form of virtual machines, containers, bare metal instances, and the like. CSPI 120 thus provides infrastructure and a set of complementary cloud services that enable customers to build and run a wide range of applications and services in a highly available hosted environment. The customer does not typically manage or control the underlying physical resources provided by CSPI 120, but has control over operating systems, storage, and deployed applications; and possibly limited control of select networking components (e.g., firewalls).

As depicted in FIG. 1, the CSP may provide a console 102 that enables customers and network administrators to configure, access, and manage resources deployed in the cloud using CSPI 120. In certain embodiments, console 102 is an application that is executed by a computer system. Console 102 provides an interface (e.g., a web-based user interface, a command line interface (CLI), etc.) that can be used to access and manage resources hosted by CSPI 120. As described below in further detail, a user can use console 102 to select and provide information regarding a CPE for which configuration information is to be generated. This information is then provided to CHS 112, which is configured to generate the configuration information. Console 102 may present one or more graphical user interfaces to the user to output information to the user and also to receive information from the user. For example, UIs may be displayed that allow the user to select a CPE to be configured, to provide information regarding certain configuration parameters to be included in the configuration information, and the like. For a user using console 102, the console may first authenticate the user based on access controls associated with the customer's account with the CSP and enable the user to log in only upon successful authentication.

As depicted in FIG. 1, distributed environment 100 includes a customer on-premise network 106. Customer on-premise network 106 is a network of one or more customer resources, such as one or more customer data centers. Access to customer on-premise network 106 is generally very restricted. For a customer that has both a customer on-premise network 106 and one or more VCNs deployed or hosted in the cloud by CSPI 120, the customer generally wants their on-premise network 106 and their cloud-based VCN networks such as customer VCN 122 to be able to communicate with each other. This enables a customer to build an extended hybrid environment encompassing the customer's VCN hosted by CSPI 120 and their on-premises network 106.

In order to enable communications between customer on-premise network 106 and customer VCN 122, a communication channel 124 is set up, where one endpoint for communication channel 124 is in customer on-premise network 106 and the other endpoint is in CSPI 120. Communication channel 124 can traverse one or more communication networks 104, which may include a public network such as the Internet. Various different communication protocols may be used to facilitate communications between the on-premise network 106 and customer VCN 122 using communication channel 124 such as FastConnect, a virtual private network (VPN) (e.g., Internet Protocol Security (IPSec) VPN), and others.

The device or equipment in the customer on-premise network 106 that forms one end point for communication channel 124 is referred to as the customer premise equipment (CPE), such as CPE 110 depicted in FIG. 1. CPE 110 has to be properly configured, using configuration information 108, to enable the setup of communication channel 124 and to enable communications between customer on-premise network 106 and customer VCN 122 using the communication channel. However, as indicated in the background section, determining the correct configuration information 108 for CPE 110 can be quite complicated. The configuration information 108 can comprise a large set of parameters for which appropriate values have to be set. Knowledge of the values to be set for these configuration parameters may not be known to any single entity; the knowledge may be split between system administrators or network engineers of customer on-premise network 106 and system administrators or network engineers of CSPI 120, who may be completely different people. The customer has to spend a lot of time and effort in identifying the various parameters to be included in the configuration information and determining the values for the parameters. Further, the particular configuration information 108 to be applied to CPE 110 can depend upon various other factors such as the particular CPE device being used, characteristics of the communication channel being established (e.g., type of channel, protocol to be used for the communications, etc.), the CSPI equipment that forms the other end point of the communication channel, and other criteria. The problem is further aggravated because of the variety and different types of CPEs that are available. These CPEs can be from different vendors, can have different CPE platforms, have different versions, and the like. Each permutation and combination of the vendor, platform, and version, may require its own customized configuration information. Due to these complexities, it is very easy for errors to be made when configuring the CPE. These errors may result from the configuration information for a CPE not having all the requisite configuration parameters, not having the correct values set for the configuration parameters, and combinations thereof. This results in errors in setting up the communication channel, and/or the communication channel not functioning as intended.

According to certain embodiments, the task of generating the configuration information that is customized for a CPE 110 is automated and thus simplified by the configuration helper system (CHS) 112. Given information identifying the particular CPE and the particular communication channel to be established between customer on-premise network 106 and customer VCN 122, CHS 112 is capable of identifying the particular set of configuration parameters that are to be included in the configuration information for the particular CPE, gathering and/or acquiring the requisite information needed for the configuration information, and then automatically generating the configuration information 116 in a format that is compatible with the particular CPE to be configured. In certain embodiments, the configuration information can be applied to CPE 110 such that a customer-desired communication channel 124 can be set up between CPE 110 and the customer's VCN 122 that is hosted in the cloud by CSPI 120. The configuration information 108 generated by CHS 112 may be in various formats. In certain embodiments, the configuration information is in a format that is compatible with and can be applied to CPE 110. For example, configuration information 116 may be in the form of one or more configuration files that can be applied to the CPE for which the configuration information has been generated.

The configuration information 116 generated by CHS 112 can be used in different ways. In certain instances, as shown by dotted line 130 in FIG. 1, the configuration information 116 generated by CHS 112 may be communicated to console 102 and provided/output to the user of console 102 that requested the configuration information. The user can then use this information to configure CPE 110. In yet other instances, as shown by dotted line 132 in FIG. 1, the configuration information 116 may be communicated to the customer on-premise network 106 and stored as configuration information 108 that is applied to CPE 110. In yet other instances, as shown by dotted line 134 in FIG. 1, the configuration information 116 may be applied to CPE 110.

In certain embodiments, CHS 112 is provided as a tool or as a service by the CSP. While in the embodiment depicted in FIG. 1, CHS 112 is shown as separate from CSPI 120, in other embodiments, CHS 112 may be included in CSPI 120 and may be provided using resources of CSPI 120. CHS 112 has access to information related to resources (e.g., compute, memory, and networking resources) within CSPI 120, including access to information about the device or equipment endpoint of the communication channel 124 within CSPI 120. Processing performed by CHS 112 for generating the configuration information for a CPE is described below with respect to the flowcharts depicted in FIGS. 3 and 4.

Figure 2:
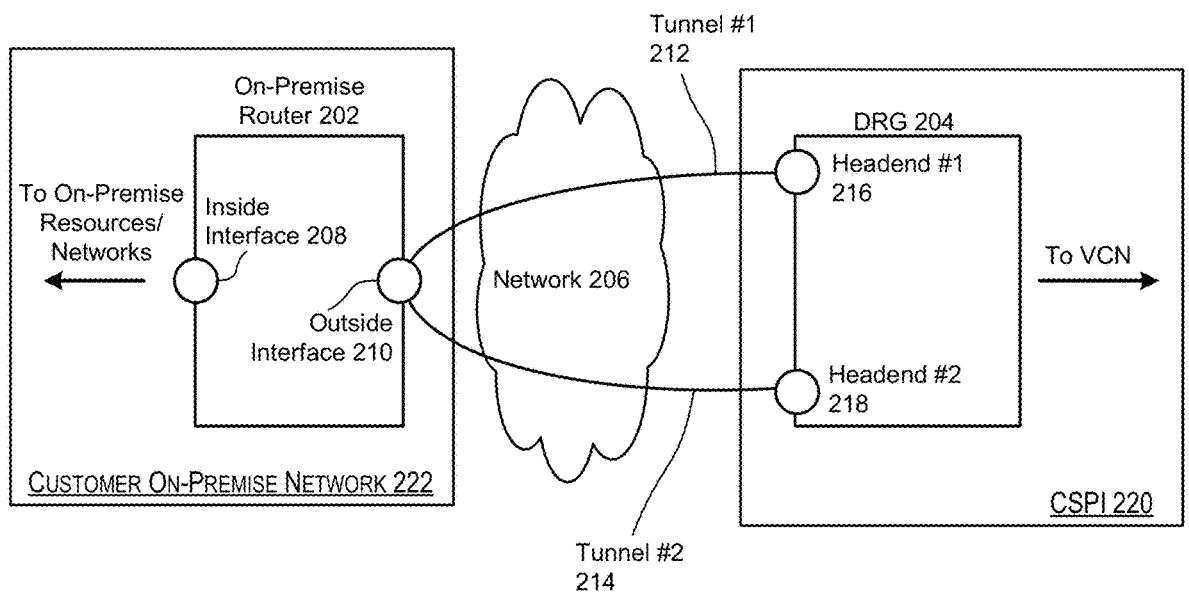
FIG. 2 depicts an example of a connection that may be established between a customer's on-premise CPE and a customer's virtual cloud network (VCN) that is hosted in the cloud using CSP infrastructure according to certain embodiments.

FIG. 2 depicts an example of a connection that may be established between a customer's on-premise CPE and a customer's virtual cloud network (VCN) that is hosted in the cloud using CSP infrastructure according to certain embodiments. In the embodiment depicted in FIG. 2, in the customer on-premise network 222, the CPE is an on-premise router 202. The on-premise router 202 shown in FIG. 2 comprises two communication interfaces or ports. These interfaces include an inside interface 208 connected to one or more other devices or networks in the customer's on-premise network, and an outside interface 210 that is configured to establish a connection with the customer's VCN that is hosted by CSPI 220.

In the embodiment depicted in FIG. 2, two separate communication connections (tunnel #1 211 and tunnel #2 214) are set up between CPE 202 and headends #1 216 and #2 218 in CSPI 220, respectively. This redundancy of headends and associated channels is provided to provide high availability. Configuration information for CPE 202 that is generated by CHS 112 enables setting up of such redundant channels using the teachings described in this disclosure. In certain embodiments, redundant CPEs may also be provided in customer's on-premise network 222 to provide high availability. Configuration information for configuring such redundant CPEs may be generated by CHS 112 using the teachings described in this disclosure.

The communication channels depicted in FIG. 2 can be of different types. For example, each of tunnels 212 and 214 depicted in FIG. 2 may be configured to be Internet Protocol Security Virtual Private Network (IPSec VPN). An IPSec VPN connection uses a secure network protocol suite that authenticates and encrypts the packets of data that are communicated between two endpoints between which the connection is set up to provide secure encrypted communication between the two endpoints. In the embodiment depicted in FIG. 2, two IPSec VPNs 212 and 214 are set up, between CPE 202 and headends 216 and 218, respectively. The VPNs traverse a communication network 206, which could be a public communication network such as the Internet.

In the embodiment depicted in FIG. 2, on the CSPI side, the communication channels are enabled using a Dynamic Routing Gateway (DRG) 204. In certain embodiments, a DRG is a gateway that can be added to or associated with a customer's VCN that is hosted by CSPI 220. The DRG 204 provides a path for private network traffic communication between a customer's VCN and the customer's on-premise network. For example, using DRG 204, the customer's VCN can establish a private connection with CPE router 202 in the customer's on-premises network 222. The DRG 204 may be configured to route communications (e.g., packets) received from the customer VCN to an appropriate entity (e.g., a compute instance) within the customer's on-premise network 222. IPSec VPN is just one example of communication technologies that can be used for communicating between a CPE in a customer's on-premise network and the customer's cloud-hosted VCN. Various other communication technologies may be used in alternative embodiments.

In certain embodiments, the configuration information (e.g., configuration information 108 in FIG. 1) generated by CHS 112 comprises a set of one or more parameters, and for each parameter, a value associated with the parameter. For example, for a particular CPE and communication channel, the configuration information may include parameters and associated values (only partial list shown) such as shown in Table 1 below.

TABLE A

Examples of configuration information parameters and associated values

| Configuration Parameter | Associated Value |
|---|---|
| Vendor | Vendor_A |
| Platform | SRX |
| Version | 17.1R8 |
| CPE IP address | 1.2.3.4 |
| CSP headend IP | 128.2.1.2 |
| Preshared key | Myawesomepresharedkey |
| BGP IP | 10.0.0.1/30 |
| Customer BGP IP | 10.0.0.2/30 |
| CSP BGP ASN | 54322 |
| Customer BGP ASN | 12345 |
| Customer outside public interface name | Et-0/1 |
| Customer security list name | mySecurityList |
| Customer on-premise subnet | NOT SPECIFIED |

Accordingly, the configuration information may comprise a set of key-value pairs, where a key identifies a parameter and the associated value identifies a parameter associated with the key.

In certain embodiments, the configuration information generated by CHS 112 may also include commands (e.g., command line interface commands (CLIs)) for applying the configuration information to a CPE, help information to guide the customer, and other information. An example of configuration information that may be generated by CHA 112 is provided below after the description for FIGS. 3, 4, 5, 6, and 7.

Figure 3:
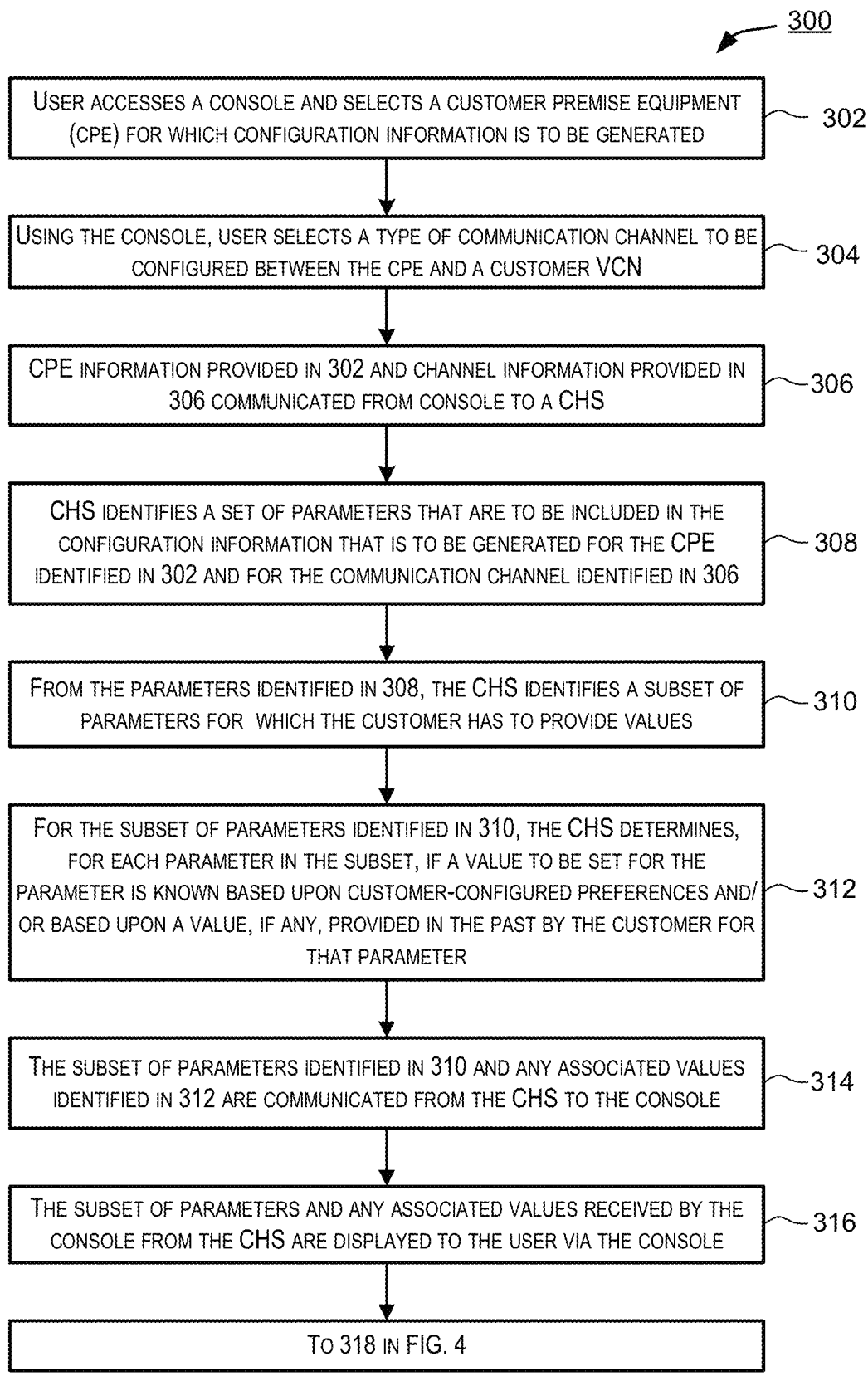
FIGS. 3 and 4 depict a simplified flow diagram illustrating an example process for generating and providing configuration information for a CPE according to certain embodiments.
Figure 4:
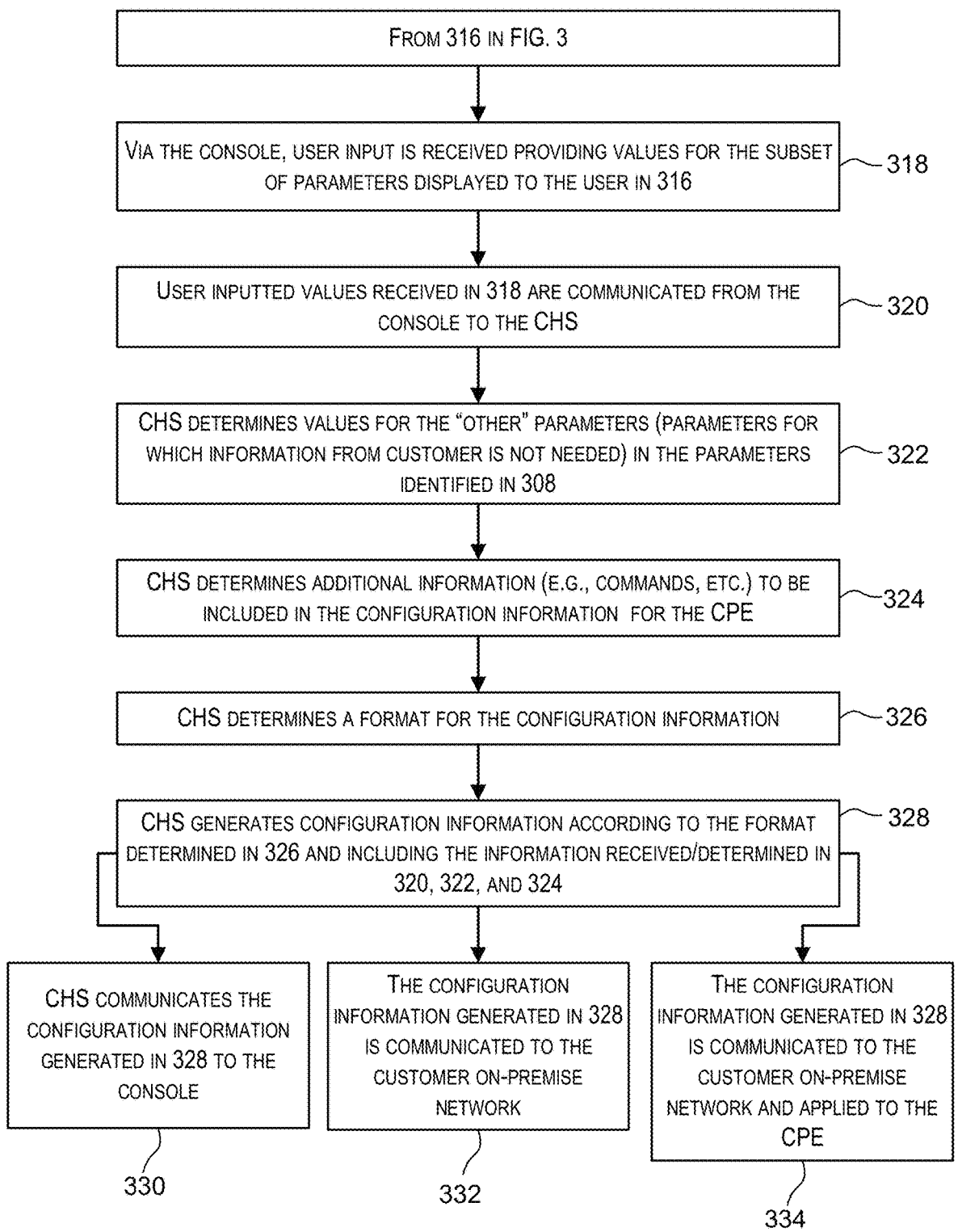

FIGS. 3 and 4 depict a simplified flow diagram 300 illustrating an example process for generating and providing configuration information for a CPE according to certain embodiments. The processing depicted in FIGS. 3 and 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 3 and 4 and described below is intended to be illustrative and non-limiting. Although FIGS. 3 and 4 depict the various processing operations occurring in a particular sequence or order, this is not intended to be limiting. In certain alternative embodiments, the processing may be performed in some different order or some operations may also be performed in parallel. In certain embodiments, such as in the embodiment depicted in FIG. 1, certain operations in the processing depicted in FIGS. 3 and 4 are performed at console 102 and certain operations are performed by CHS 112.

Figure 6:
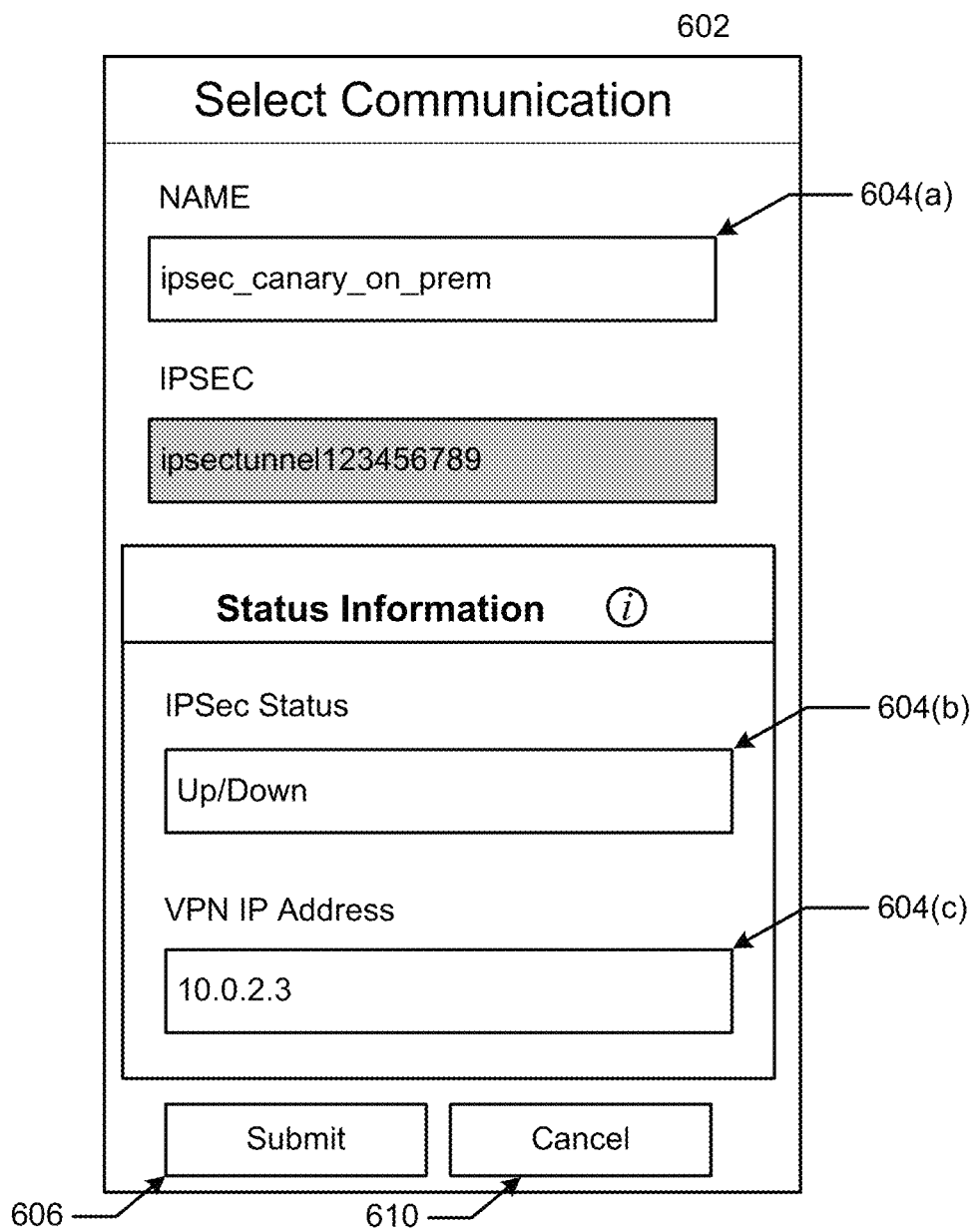
FIG. 6 provides an example of a GUI for selecting a type of communication channel to be established between a CPE and a customer's VCN, according to certain embodiments.
Figure 7:
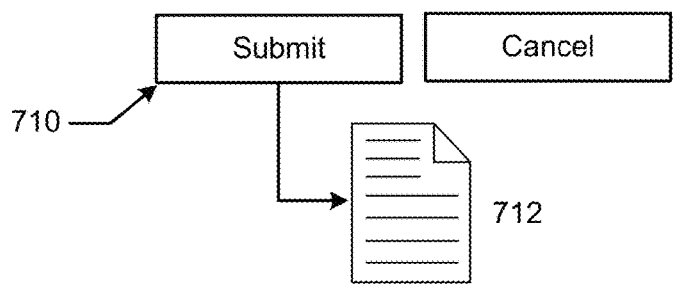
FIG. 7 depicts an example GUI that may be presented to the user by the console showing configuration parameters for which customer input is requested and via which the customer can provide values for the parameters, according to certain embodiments.

Process 300 may begin, at block 302, when a user accesses a console (e.g., console 102 in FIG. 1) and selects or identifies a particular CPE for which configuration information is to be generated. The user may be a representative of the CSP, such as a system administrator or network engineer of the CSP. In some other scenarios, the user could be a representative of a customer whose CPE is to be configured. As previously described, the console may be GUI-based applications and may present various GUIs that output information to the user and also allow the user to input information. Examples of GUIs displayed by a console, such as console 102, in relation to the processing depicted in FIGS. 3 and 4 are depicted in FIGS. 5, 6, and 7, and described below.

As part of 302, the user selects or identifies a particular CPE (e.g., CPE 110 in FIG. 1 or CPE 202 in FIG. 2) for which configuration information is to be generated. In certain embodiments, the console 102 may display a list of available CPEs available at a particular customer's on-premise network 106 and allow the user to select a particular CPE to be configured. In other embodiments, the console may display a GUI that allows the user to enter information identifying the particular CPE for which configuration information is to be generated. Various different pieces of information may be used to identify the particular CPE. For example, a CPE may be identified using one or more of: information identifying a vendor providing the CPE, information identifying a platform for the CPE, and version information for the CPE. In certain examples, the version information may identify a version of the software and/or hardware of the CPE. The user may provide this information to identify a specific CPE. Examples of CPEs include routers, bridges, firewall devices, cable modems, DSL modems, or another computer system in the customer's on-premise network that acts as the endpoint for the communication channel between the customer on-premise network and the customer's VCN hosted by CSPI.

There are various different vendors that provide CPEs. A single vendor may provide multiple platforms. The platforms, in turn, may have different versions corresponding to different hardware and/or software configurations.

Figure 5:
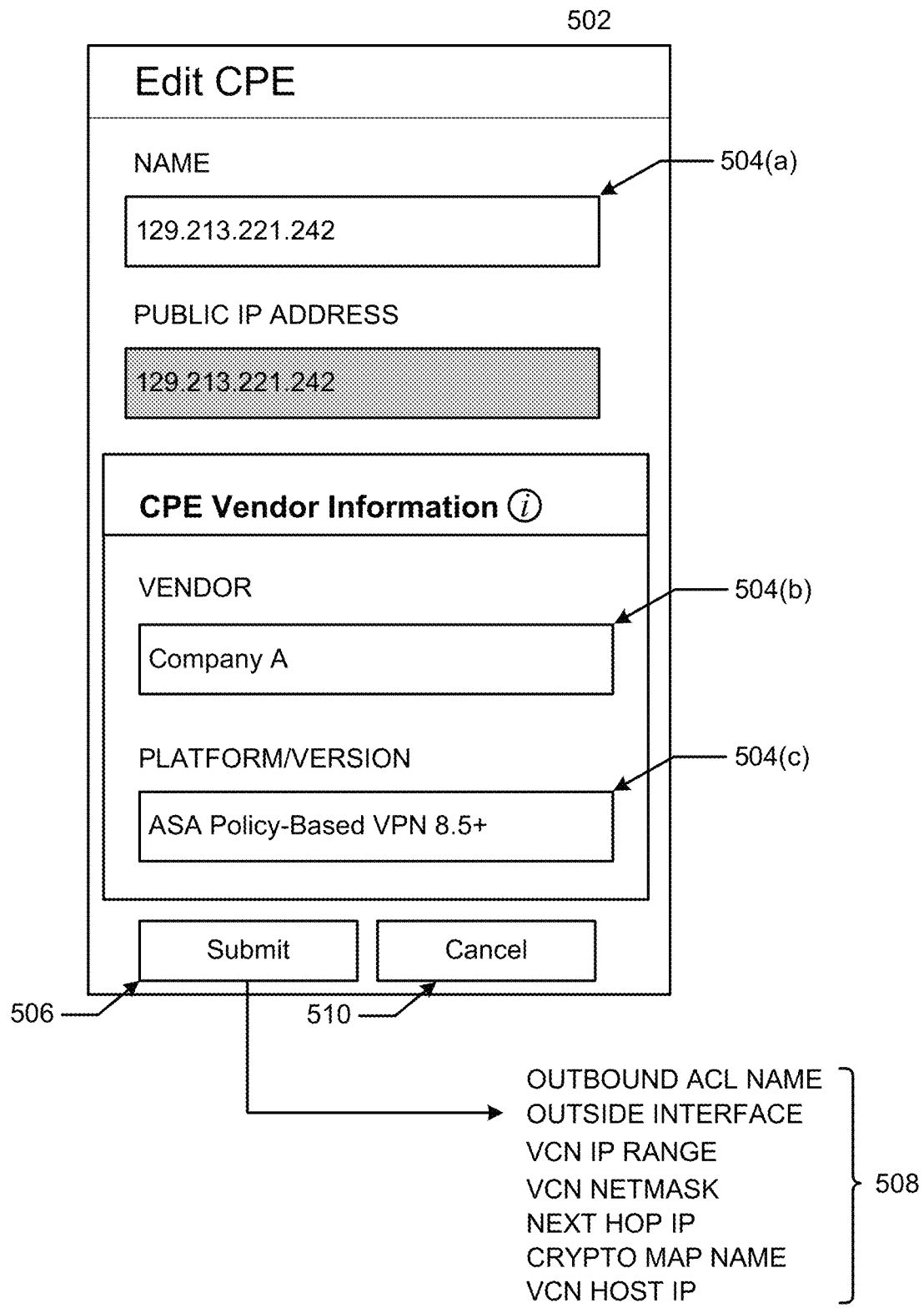
FIG. 5 depicts an example GUI that enables a user to input information for a CPE for which configuration information is to be generated, according to certain embodiments.

FIG. 5 depicts an example GUI 502 that enables a user to input information for a CPE for which configuration information is to be generated, according to certain embodiments. As shown, GUI 502 includes a number of text input fields 504(a), 504(b), and 504(c), collectively "text input fields 504", in which the user may enter information related to the CPE. For example, the user can enter a name (or identifier) for the CPE in text field 504(a). In the example depicted in FIG. 5, the user has entered a CIDR address "129.213.221.242" for the CPE in field 504(a). Text field 504(b) provides a field in which the user can enter information identifying a vendor of the CPE. In the example depicted in FIG. 5, the user has entered "Company A" as the vendor in field 504(b). Text field 504(c) provides a field in which the user can enter information identifying a platform and a version of the CPE. In the example depicted in FIG. 5, the user has entered "ASA Policy-Based VPN" for platform and "8.5+" for version in field 504(c). In some other embodiments, the text fields 504 may include drop-down menus, or other tools that enable selection of values for the fields. In various other embodiments, other information related to the CPE may be provided, in addition to vendor, platform, and version information.

Each combination of information identifying a CPE identifies a particular CPE. The greater the specificity of the provided information, the more specific the identified CPE. For example, providing the vendor information, platform information, version information, and potentially other information, identifies the CPE with greater specificity. In certain embodiments, greater specificity translates to better customization of the configuration information that is generated by CHS 112 for that CPE. This is because the configuration information for a CPE with a certain combination of (vendor, platform, version) values may be different from configuration information for a CPE with a different combination. In certain embodiments, the combination of vendor information and platform information may together identify a particular device and the version may identify the version of the device. Even for the same vendor and same platform, the configuration information for two different versions of the CPE may be different.

Once each of the appropriate text input fields 504 has been populated with information specific to the CPE for which configuration information is to be generated, the user may then select a submission element 506 (e.g., button 506) to submit the entered values. In some embodiment, upon selection of the submission element 506, the data values entered into the text input fields 504 are transmitted to CHS 112. In other aspects, cancel element 510 may be selected to return the data values to a default state without the values being submitted to CHS 112.

Returning to FIG. 3, at block 304, the user, using console 102, selects a type of communication channel that is to be established between the CPE 110 and the customer VCN 122 and for which configuration information is to be generated. In certain embodiments, different types of communication channels may be established between a CPE in the customer on-premise network and the customer's VCN hosted by CSPI 120. The configuration information for the CPE may be dependent upon the particular communication channel that is selected in 306. Examples of communication channel types include a IPSec VPN, a FastConnect channel (e.g., Ethernet peering), satellite communication peering and others.

FIG. 6 provides an example of a GUI 602 for selecting a type of communication channel to be established between a CPE and a customer's VCN, according to certain embodiments. As shown in FIG. 6, GUI 602 includes a number of text input fields 604(a), 604(b), and 604(c), collectively "text input fields 604", each associated with a parameter related to the type of communication to be established. In the embodiment depicted in FIG. 6, GUI 602 is depicted with reference to an IPSec type of communication channel. This however is not intended to be limiting or restrictive in any manner. Other different types of communication channels may be available for selection in other instances, each with their own set of parameters and associated values.

In GUI 602 depicted in FIG. 6, the user is presented with and can enter information in text input fields 604(a), 604(b), and 604(c) to identify the type of communication channel. The user can populate the text input fields 604(a) with information specific to the type of communication channel selected. Information specifying a name to be given to the communication channel can be entered in text field 604(a). A status of the connection (e.g., up, down, unavailable, provisioning, etc.) may be provided in text field 604(b). A VPN IP address may be entered in text field 604(c). In some embodiments, drop-down menus may be provided that allow the user to select values for the different fields from a list of values. After all the appropriate values characterizing the communication channel to be established have been entered in the various fields of GUI 602, the user may select submission element 606 (e.g., button 606) to submit the parameters and the entered values to CHS 112. In other aspects, cancel element 610 may be selected to return the data values to a default state without the value being submitted to CHS 112.

Returning back to FIG. 3, at block 306, information received in 302 identifying the CPE and information received in 306 identifying the type of communication channel to be established between the CPE and the customer's VCN (i.e., information provided in blocks 304 and 306) is communicated to from the console to CHS 112. The information may be communicated as a request from the console system 102 to CHS 112 for the CHS 112 to generate configuration information for CPE 110 for enabling setting up of the communication channel between the CPE 110 and an endpoint in CSPI 120 (e.g., between the CPE and the customer' VCN 122 hosted by CSPI 120). In certain embodiments, the information is communicated in encrypted form. For example, the console creates an encrypted file containing the information, and then transfers the encrypted file to CHS 112.

At block 308, CHS 112 identifies a set of parameters to be included in the configuration information that is to be generated for the CPE identified in 302 and for the communication channel identified in 304. In certain embodiments, the set of parameters identified in 308 are also dependent upon the device or equipment that forms the endpoint of the communication channel on the CSPI side. The set of parameters identified in 308 represent parameters for which values need to be set in order to properly set up the communication channel between the CPE and the customer VCN and to ensure proper communications using the channel. Since CHS 112 can be provided by the CSP providing CSPI 120, CHS 112 has access to information identifying the equipment that forms the endpoint of the communication channel on the CSPI side. For example, if an IPSec VPN communication channel is to be set up, the CHS 112 may identify a set of parameters (depicted in FIG. 5 as 508) for which data values are to be configured for setting up and activating the IPSec VPN channel.

There are various ways in which the CHS 112 can identify the set of parameters in 308. In certain embodiments, the CHS 112 has access to information storing a parameter set for each of the various CPE devices. For example, as depicted in FIG. 1, the CHS 112 has access to CPE-specific information sets 114, which may comprise, for each variation of a CPE, the set of parameters to be included in the configuration information for that CPE for the particular communication channel. Information 114 may be stored in a persistent stores such as in a database accessible to the CHS 112. In certain embodiments, the information may be curated by representatives of the CSP and may be based upon information published by the vendors of the CPEs. For example, sets may be provided as follows:

Vendor1, Platform1, Version1, Communication channel Type1→Set 1
Vendor1, Platform1, Version2, Communication channel Type1→Set 2
Vendor1, Platform1, Version1, Communication channel Type2→Set 3
Vendor1, Platform2, Version1, Communication channel Type1→Set 4
Vendor1, Platform2, Version1, Communication channel Type2→Set 5
Vendor1, Platform3, All communication channel types→Set 6
Vendor2, Platform1, Version1, Communication channel Type1→Set 7
Vendor2, Platform1, Version1, Communication channel Type2→Set 8
Vendor2, Platform2, Version1, All communication channel types→Set 9
Vendor2, Platform2, Version2, All communication channel types→Set 10 and so on.

Each unique combination of vendor information, platform information, and version information may identify a particular CPE. The particular CPE coupled with a particular communication channel type can be mapped to a corresponding set of parameters to be included in the configuration information for that CPE.

In certain embodiments, the set of parameters to be included in the configuration information for the CPE may depend only upon the CPE information and not on the communication channel type information. For example, for a particular CPE, the set of parameters may be the same irrespective of the type of communication channel being configured between the customer on-premise network and the customer VCN.

As part of the processing performed in 308, using the CPE and communication channel information provided by the user and received from the console, the CHS 112 searches information 114 using the CPE and channel information as search keys and identifies a particular set of parameters applicable for that combination. The one or more parameters identified in this particular set represent the parameters that are to be included in the configuration information for that CPE for that communication channel. For example, for the CPE information provided in FIG. 5 and the communication channel information provided in FIG. 6, the set of parameters identified in 308 may include the parameters shown as 508 in FIG. 5.

At block 310, from the parameters identified in 308, the CHS 112 identifies a subset of parameters for which the customer has to provide associated values. This subset of parameters represent parameters associated with customer-specific values that may not be known to CHS and the CSP. These parameters may include, for example, IP addresses of equipment (e.g., the CPE) in customer on-premise network, encryption keys used by the customer, and other like parameters whose values are known to the customer. The set of parameters identified in 308 may also include other parameters that may be CSPI specific and these are not included in the subset identified in 310. These are dealt with in block 322, as described below. In certain embodiments, for the set of parameters identified in 308, the subset of parameters may have special tags associated with them. The CHS 112 may use these special tags to identify the subset in 310.

At block 312, for the subset of parameters identified in 310 for which the customer has to provide parameter values, the CHS 112 determines, for each parameter in the subset, if a value to be set or associated with the parameter is already known to the CHS 112 based upon customer-configured preferences and/or based upon a value, if any, provided in the past (e.g., before 302 or before the CHS receives the request for generating the configuration information) by that customer for that parameter. To facilitate the processing in 312, the CHS 112 may access the particular customer's preferences information and may also access information storing any prior values provided by that customer for any of the parameters included in the subset identified in 310. For example, in the embodiment depicted in FIG. 1, the CHS 112 accesses customer preferences and prior-provided information 118 to determine if any values have been previously provided or configured for any of the parameters included in the subset of parameters identified in 310. The information in 118 may be stored in the form of key-value pairs, where the key identifies a parameter and the associated value identifies a parameter provided for that parameter.

In certain embodiments, a customer may configure preferences at the vendor level, at the (vendor+platform) level, or at the (vendor+platform+version) level. If a value for a particular parameter has been configured by the customer at the vendor level, then in 312, that same value may be associated with the parameter for different CPEs from the same vendor irrespective of the platform and version information. In a similar manner, if a value for a particular parameter has been configured by the customer at the (vendor+platform) level, then in 312, that value may be associated with the parameter for different versions of the CPE under the same vendor and platform.

In certain embodiments, the CHS 112 is configured to record or store information regarding values provided by the customer in the past for a parameter. As part of the processing in 312, the CHS 112 may refer to this historical information recorded for the customer to identify values to be associated with the subset of parameters determined in 310. The prior customer-provided information that may be stored are different levels of specificity, such as, at the vendor level, at the (vendor+platform) level, or at the (Vendor+platform+version) level. As part of the processing in 312, the CHS 112 may, starting from the most specific level, determine if a value has been provided by the customer in the past for a particular parameter. A value provided at a more specific level is preferred over a value provided at a less specific level. For example, if the CPE for which configuration information is to be generated is specified using vendor (V1), platform (P1), and version (Ver1) information, then, for a particular parameter, the CHS 112 first determines if the customer has provided a value for that particular parameter at the (V1+P1+Ver1) level. If so, that value is identified as the value in 312 for that particular parameter. If not, then the CHS 112 sees if a customer-provided value is stored at the (V1+P1) level and uses that value. If not, then the CHS 112 sees if a customer-provided value is stored at the (V1) level and uses that value. In some instances, if a value cannot be determined even at the vendor level, then the CHS 112 may even determine if a value has been provided by the customer for that particular parameter for a CPE from another vendor and identify that value as the value for the particular parameter in 312.

At block 314, information identifying the subset of parameters identified in 310 and any associated values for the subset identified in 312 are communicated from the CHS 112 to the console from which the request was received in 306. For example, for the embodiment depicted in FIG. 1, the information is communicated from the CHS 112 to console 102.

At block 316, the subset of parameters and any associated values received from the CHS 112 are output via the console. For example, the parameters and any associated values may be output via the console 102 such that the user of the console can see the parameters and any associated values and can provide inputs with respect to the parameters.

In certain embodiments, a GUI may be generated to output the parameters in the subset and to show any associated values. The GUI may identify the specific CPE and the specific communication channel. The GUI may also output parameters in the subset of parameters for which customer input is requested. For each parameter, an associated field (e.g., text field) may be provided where the user of the console can enter a value for the parameter. For a particular parameter, if an associated value for that parameter was determined in 314, then that value may be displayed in the associated field (i.e., the field may be pre-filled with the associated value). For a parameter identified in 310, if no associated value was determined for that parameter in 312, then the associated field is left blank.

At block 318 (in FIG. 4), the user may, via the console, provide values for one or more of the parameters output in 316. For a parameter that already has an associated value displayed, the user may keep the value the same (i.e., not change the value) or may change the value to a different value. For a parameter that does not already have an associated value, the user may enter a value for the parameter. Accordingly, the GUI displayed to the user in 316 enables the user to provide value for parameters for which customer input is needed.

FIG. 7 depicts an example GUI 700 that may be presented to the user by the console showing configuration parameters for which customer input is requested and via which the customer can provide values for the parameters, according to certain embodiments. As shown in GUI 700, information 701 is displayed identifying the specific CPE or which configuration information is to be generated. Information 702 related to the communication channel to be established is also displayed. Area 703 of GUI 700 displays a set of parameters for which customer input is requested. The parameters displayed in FIG. 7 include: outbound ACL name, outside interface, VCN IP range, VCN netmask, Next hop IP, crypto map name, and VCN host IP. An input field (e.g., text input field 704) is displayed associated with each parameter. If an associated value was determined for a parameter in 312, then that value would be displayed in the field associated with the parameter. For a displayed parameter, the user (e.g., a customer representative) can enter a value for that parameter in the input field associated with that parameter. For a field that has been pre-filled, the user can leave the value the same, or change that value to a different value.

To help the user enter a value for a parameter, a user-selectable helper element 706 is displayed. When the user interacts with this element, such as by hovering over the element or clicking the element, guide information 708 is displayed to the user that provides guidance regarding the parameter and also regarding the values that can be set for that parameter and details on types of information that should be entered into the text input field 704. For example, in the embodiment depicted in FIG. 7, the user has interacted with the help element associated with parameter "VCN host IP" and in response information 708 is displayed explaining the parameter and the information to be entered for that parameter.

After the user has provided the values for the parameters in 318, at block 320, the user inputs are communicated from the console to the CHS 112. For example, for GUI 700 depicted in FIG. 7, the user may select a submission element 710. In some aspects, upon selection of the submission element 710, the values entered into the various fields 704 are transmitted to the CHS 112. In certain embodiments, the values are communicated as key-value pairs, with the key corresponding to a parameter and the user input value corresponding to the value associated with that parameter.

As previously described, at block 310, the CHS 112 identifies a set of parameters that are to be included in the configuration information to be generated for the particular CPE. Then, at block 312, the CHS 112 identifies, from the parameters identified in 310, a subset of the parameters for which customer input is needed, and this customer input is received in 320. The set of parameters identified in 310 also may comprise "other" parameters for which customer input is not needed. These "other" parameters are generally parameters that are specific to the CSPI and information regarding the values to be set for these "other" parameters is known to the CHS 112. At block 322, the CHS 112 determines the values for these other parameters.

At block 324, the CHS 112 determines additional information, if any, to be included in the configuration information to be generated for the CPE. This additional information may be of various types. For example, in some instances, the additional information may include commands (e.g., Command Line Interface commands) to be included in the configuration information for the CPE. The additional information may also include help information that explains the configuration information and helps the customer understand the configuration information. In certain embodiments, the CHS 112 may determine the additional information from the CPE-specific information sets 114. In addition to identifying the parameters to be included in the configuration information for a CPE, the CPE-specific information set may also identify the additional information that is to be included in the configuration information for the CPE.

At block 326, the CHS 112 determines a format for generating the configuration information for the CPE. The format may be CPE specific. The format may indicate, for example, identify the file format (e.g., text file, Excel file, JSON format, etc.) to be used for the configuration information. In certain embodiments, the format may specify that the configuration information is to be generated in a specific machine-readable or machine-executable format that is readable or executable by the CPE for which the configuration information is to be generated. In some instances, the file format may be based on a user role (e.g., customer on-premise network admin, cloud service provider network admin, etc.), and factors associated with the customer on-premise network. In certain embodiments, the format information may be identified in the CPE-specific information sets 114.

At block 320, the CHS 112 generates the configuration information for the CPE. The configuration information that is generated may include the set of parameters identified in 308 and their associated values (these include parameters for which the customer has provided values and other parameters for which values are determined in 322. The configuration information also includes any addition information determined in 324. The configuration information is generated according to the format determined in 326. For example, the configuration information may be generated in the format of a configuration file that is readable by or executable by the CPE.

An example of a configuration file generated by the CHS 112 is provide below. As shown in the example below, information that may be included in the configuration information can include:

(a) Parameters and their corresponding values. These parameters may include parameters whose values are provided by the customer and parameters whose value are known to or provided by the providers of the CSPI. For example:

---
Cpe: ocid.oc1.cpe.cpeocidfoo
ip address: 1.2.3.4
Tunnel 1: ocid.oc1.ipsectunnel.foobarbaz
CSPI headend ip: 128.2.1.2
preshared key     : myawesomepresharedkey
CSPI bgp ip       : 10.0.0.1/30
customer bgp ip   : 10.0.0.2/30
CSPI bgp asn      : 54322
customer bgp asn  : 12345
outside public interface name: et-0/1    #customer on-premise value
security list name            : mySecurityList #customer on-premise value
customers on premise subnets : NOT SPECIFIED,
replacement token $ON_PREMISE_SUBNETS
---

(b) Additional information, e.g., commands, help information.

Command Example

---
set security ike proposal oracle-ike-proposal authentication-method pre-shared-keys
set security ike proposal oracle-ike-proposal authentication-algorithm sha-384
set security ike proposal oracle-ike-proposal encryption-algorithm aes-256-cbc
set security ike proposal oracle-ike-proposal lifetime-seconds 28800
set security ike proposal oracle-ike-proposal dh-group group5
---

Help Information Example

---
The configuration template involves setting up the following:
PHASE 1
PHASE 2
SETTING THE SECURITY ZONES FOR ORACLE
SETTING THE SECURITY POLICIES FOR ORACLE
SETTING THE SECURITY SETTING FOR ORACLE
SETTING BGP/STATIC ROUTING
---------------------------------------------------------------------------
Setting up Public Interface with the CPE Public IP.
set interfaces et0.1 unit 0 family inet address 1.2.3.4
Internet Key Exchange (IKE) Configuration (Phase 1)
Defining the IKE Proposal for CSPI
This IKE (Phase 1) configuration template uses AES256, SHA384, Diffie-
Hellman Group 5, and 28800 second (8 hours) IKE session key lifetime.
If different parameters are required, modify this template before applying
the configuration.
---

The configuration information may be generated in different formats. For example, in certain embodiments, a single configuration file may be generated containing configuration information in JSON format. In certain embodiments, the information in the configuration file is "commented out" and it is up to the customer system administrator to uncomment those portions of the configuration information that are to be applied to a CPE. This gives the customer complete control over the configuration information that is applied to the CPE.

The configuration information generated in 326 can be used in various different ways. For example, at block 330, the configuration information generated in 328 may be communicated from the CHS 112 to the console and provided/output to the user of the console that requested the generation of the configuration information. The user can then use the configuration information to configure CPE 110. For example, the CHS 112 can transmit the configuration information to the console for display in a graphical user interface, or store it as a file to be selected by the user of the console, or a copy of the configuration information can be saved to a local file system for subsequent configuration of the CPE.

In yet other instances, as shown at block 332, the configuration information generated in 328 may be communicated from the CHS 112 to the customer on-premise network containing the CPE for which the configuration information is generated. For example, as shown in FIG. 1, the configuration information may be communicated and stored by the customer on-premise network as configuration information 108 that is to be applied to CPE 110.

In yet other instances, as shown in block 334, the configuration information generated in 328 may be communicated to the customer on-premise network and applied to the CPE. For example, the configuration information may be generated in a form that is executable by or directly applicable to the CPE.

As described above, the CHS 112 automates and thus simplifies the task of generating configuration information for a CPE. Given information identifying a particular CPE and a particular communication channel to be established between the CPE and the customer's cloud/CSPI-hosted network, the CHS 112 identifies a particular set of configuration parameters that are to be included in the configuration information for the particular CPE. The CHS 112 further identifies a subset of parameters for which the customer has to provide values. These values are obtained from the customer. The CHS 112 also identifies any additional information to be included in the configuration information and generates the configuration information according to an appropriate format. The generated configuration information can then be applied to the CPE. The CHS 112 thus simplifies the task of generating accurate configuration information for a CPE.

From the customer's perspective, the customer only has to provide information related to the CPE to be configured. This provided information can include some combination of vendor, platform, and version information for the CPE. Optionally, the customer can provide information related to the communication channel between the on-premise CPE and the cloud or CSPI-hosted network. The CHS 112 then automatically generates the configuration information for the CPE. Additionally, inputs provided by the customer for previous configurations are stored and presented to the customer. This way the customer does not have to repeat previously provided information. At the same time, the customer is given the opportunity to change this previously provided information if so desired. Only those parameters that are needed for the configuration information are provided to the customer for input. This prevents the customer from being overwhelmed with a large number of parameters, many of which may are not needed for the configuration information for the CPE. There are various different ways in which the generate configuration information is delivered to the customer. In certain instances, the customer can download a copy of the configuration information. In some other instances, the generated configuration information may be automatically downloaded to the on-premise site or even to the CPE to be configured. In yet other instances, and as permitted by the customer, the generated configuration information may be applied to the CPE.

As described above, in certain embodiments, the CHS 112 uses CPE-specific sets of information (e.g., 114 in FIG. 1) to determine the parameters to be included in the configuration information, any additional information to be included, and also the format to be used for generating the configuration information. These CPE-specific sets can be modified or changed as the information needed for a CPE changes, the information to be included changes, or if the format changes. In certain embodiments, as needed, providers of the CHS 112 can make changes to CPE-specific sets of information. This provides great flexibility in the use of CPE-specific sets of information for driving the generation of configuration information for specific CPEs.

Example Configuration Information for a CPE

The following provides an example of a configuration file that may be generated by the CHS 112 according to certain embodiments.

```
# ------------------------------------------------
# Configuration Template
# The configuration consists of two IPSec tunnels. CSP highly recommends that
# you configure both tunnels for maximum redundancy.
# ------------------------------------------------
# This configuration is for the following vendor platform and version:
# Vendor : Vendor_A
# Platform : SRX
# Version : > 17.1R8
# ------------------------------------------------
# The following configuration parameters are from the CSP service
# Cpe: ocid.oc1.cpe.cpeocidfoo
ip address: 1.2.3.4

Tunnel 1: ocid.oc1.ipsectunnel.foobarbaz
CSPI headend ip: 128.2.1.2
# preshared key : myawesomepresharedkey
# CSPI bgp ip : 10.0.0.1/30
# customer bgp ip : 10.0.0.2/30
# CSPI bgp asn : 54322
# customer bgp asn : 12345

# Tunnel 2: ocid.oc1.ipsectunnel.bimbop
# CSPI headend ip: 128.2.2.2
# preshared key : mymoreawesomepresharedkey
# CSPI bgp ip : 10.0.0.5/30
# customer bgp ip : 10.0.0.6/30
# CSPI bgp asn : 54322
# customer bgp asn : 12345
# ------------------------------------------------
# The following configuration parameters are from the customer's on premise
# configuration
# Common parameters
# outside public interface name: et-0/1
# security list name : mySecurityList
# customers on premise subnets : NOT SPECIFIED, replacement token
$ON_PREMISE_SUBNETS

# Tunnel 1 parameters: ocid.oc1.ipsectunnel.foobarbaz
# inside tunnel interface name : st0.104

# Tunnel 2 parameters: ocid.oc1.ipsectunnel.bimbop
# inside tunnel interface name : st0.105

```

```
# ------------------------------------------------------------------------
# The configuration template involves setting up the following:
PHASE 1
PHASE 2
SETTING THE SECURITY ZONES FOR ORACLE
SETTING THE SECURITY POLICIES FOR ORACLE
SETTING THE SECURITY SETTING FOR ORACLE
# SETTING THE BGP/STATIC ROUTING
# ------------------------------------------------------------------------
# Setting up Public Interface with the CPE Public IP.
set interfaces et0.1 unit 0 family inet address 1.2.3.4
Internet Key Exchange (IKE) Configuration (Phase 1)
Defining the IKE Proposal for CSPI
This IKE (Phase 1) configuration template uses AES256, SHA384, Diffie-
Hellman Group 5, and 28800 second (8 hours) IKE session key lifetime.
If different parameters are required, modify this template before applying
the configuration.
set security ike proposal oracle-ike-proposal authentication-method pre-shared-keys
set security ike proposal oracle-ike-proposal authentication-algorithm sha-384
set security ike proposal oracle-ike-proposal encryption-algorithm aes-256-cbc
set security ike proposal oracle-ike-proposal lifetime-seconds 28800
set security ike proposal oracle-ike-proposal dh-group group5
# Defining the IKE Policy for Oracle
# Tunnel 1: ocid-oc1.ipsectunnel.foobarbaz
set security ike policy ike_pol_CSPI-vpn-128.2.1.2 mode main
set security ike policy ike_pol_CSPI-vpn-128.2.1.2 proposals oracle-ike-proposal
set security ike policy ike_pol_CSPI-vpn-128.2.1.2 pre-shared-key ascii-text
myawesomepresharedkey
set security ike gateway gw_CSPI-128.2.1.2 ike-policy ike_pol_CSPI-vpn-128.2.1.2
set security ike gateway gw_CSPI-128.2.1.2 external-interface et-0/1
set security ike gateway gw_CSPI-128.2.1.2 address 128.2.1.2
set security ike gateway gw_CSPI-128.2.1.2 dead-peer-detection
set security ike gateway gw_CSPI-128.2.1.2 local-identity inet 1.2.3.4
# Tunnel 2: ocid.oc1.ipsectunnel.bimbop
set security ike policy ike_pol_CSPI-vpn-128.2.2.2 mode main
set security ike policy ike_pol_CSPI-vpn-128.2.2.2 proposals
CSPI-ike-proposal
set security ike policy ike_pol_CSPI-vpn-128.2.2.2 pre-shared-key ascii-text
mymoreawesomepresharedkey
set security ike gateway gw_CSPI-128.2.2.2 ike-policy ike_pol_CSPI-vpn-128.2.2.2
set security ike gateway gw_CSPI-128.2.2.2 external-interface et-0/1
set security ike gateway gw_CSPI-128.2.2.2 address 128.2.2.2
set security ike gateway gw_CSPI-128.2.2.2 dead-peer-detection
set security ike gateway gw_CSPI-128.2.2.2 local-identity inet 1.2.3.4
# IPSec Configuration
# Defining the IPSec (Phase 2) Proposal for CSPI
# The IPSec proposal defines the protocol, authentication, encryption, and
# lifetime parameters for the IPsec security association.
# The configuration template sets AES256 for encryption, SHA1 for
# authentication, enables PFS group 5, and sets the IPSec session key
# lifetime to 3600 seconds (1 hour) .
# The IPsec policy incorporates the Diffie-Hellman group and the IPsec
# proposal.
# If different parameters are required, modify this template before applying
the configuration.
set security ipsec vpn-monitor-options
set security ipsec proposal CSPI-ipsec-proposal protocol esp
set security ipsec proposal CSPI-ipsec-proposal authentication-algorithm hmac-sha1-96;
set security ipsec proposal CSPI-ipsec-proposal encryption-algorithm aes-256-cbc
set security ipsec proposal CSPI-ipsec-proposal lifetime-seconds 3600
# Defining the IPSec (PHASE 2) policy for CSPI
set security ipsec policy ipsec_pol_CSPI-vpn perfect-forward-secrecy keys group5
set security ipsec policy ipsec_pol_CSPI-vpn proposals
CSPI-ipsec proposal
# Defining Security Association for CSPI
# The df-bit clear option allows the SRX to fragment the packet and send it
# to the end host in CSPI to reassemble the packet.
# Tunnel 1: ocid.oc1.ipsectunnel.foobarbaz
set security ipsec vpn CSPI-vpn-128.2.1.2 bind-interface st0.104
set security ipsec vpn CSPI-vpn-128.2.1.2 vpn-monitor
set security ipsec vpn CSPI-vpn-128.2.1.2 ike gateway gw_CSPI-128.2.1.2
set security ipsec vpn CSPI-vpn-128.2.1.2 ike ipsec-policy ipsec_pol_CSPI-vpn
set security ipsec vpn CSPI-vpn-128.2.1.2 df-bit clear
set security ipsec vpn establish-tunnels immediately
# Tunnel 2: ocid.oc1.ipsectunnel.bumbop
set security ipsec vpn CSPI-vpn-128.2.2.2 bind-interface st0.105
set security ipsec vpn CSPI-vpn-128.2.2.2 vpn-monitor
set security ipsec vpn CSPI-vpn-128.2.2.2 ike gateway gw_CSPI-128.2.2.2
set security ipsec vpn CSPI-vpn-128.2.2.2 ike ipsec-policy ipsec_pol_CSPI-vpn
```

```
set security ipsec vpn CSPI-vpn-128.2.2.2 df-bit clear
set security ipsec vpn establish-tunnels immediately
```

Example Implementation of CSPI

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
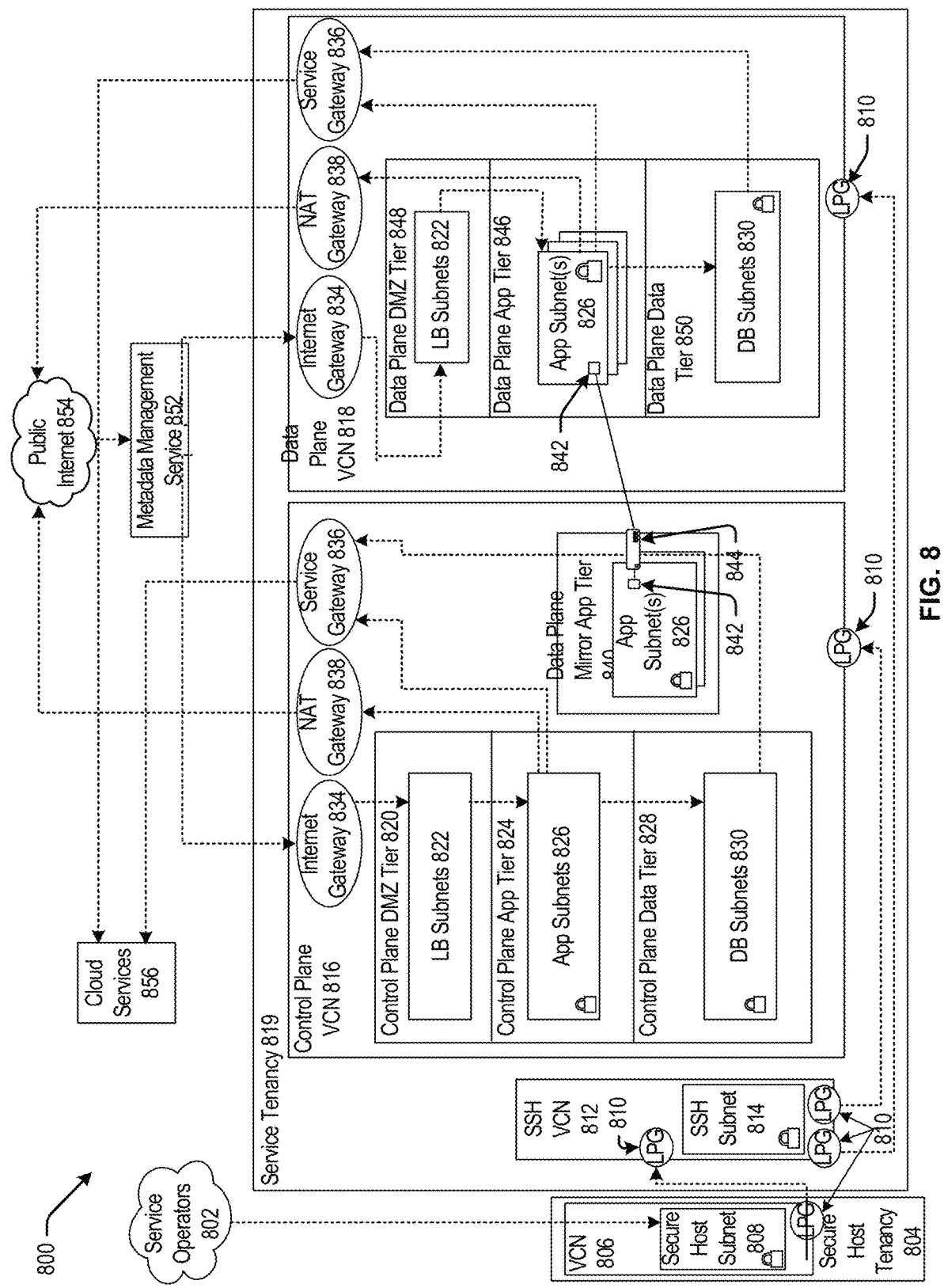
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
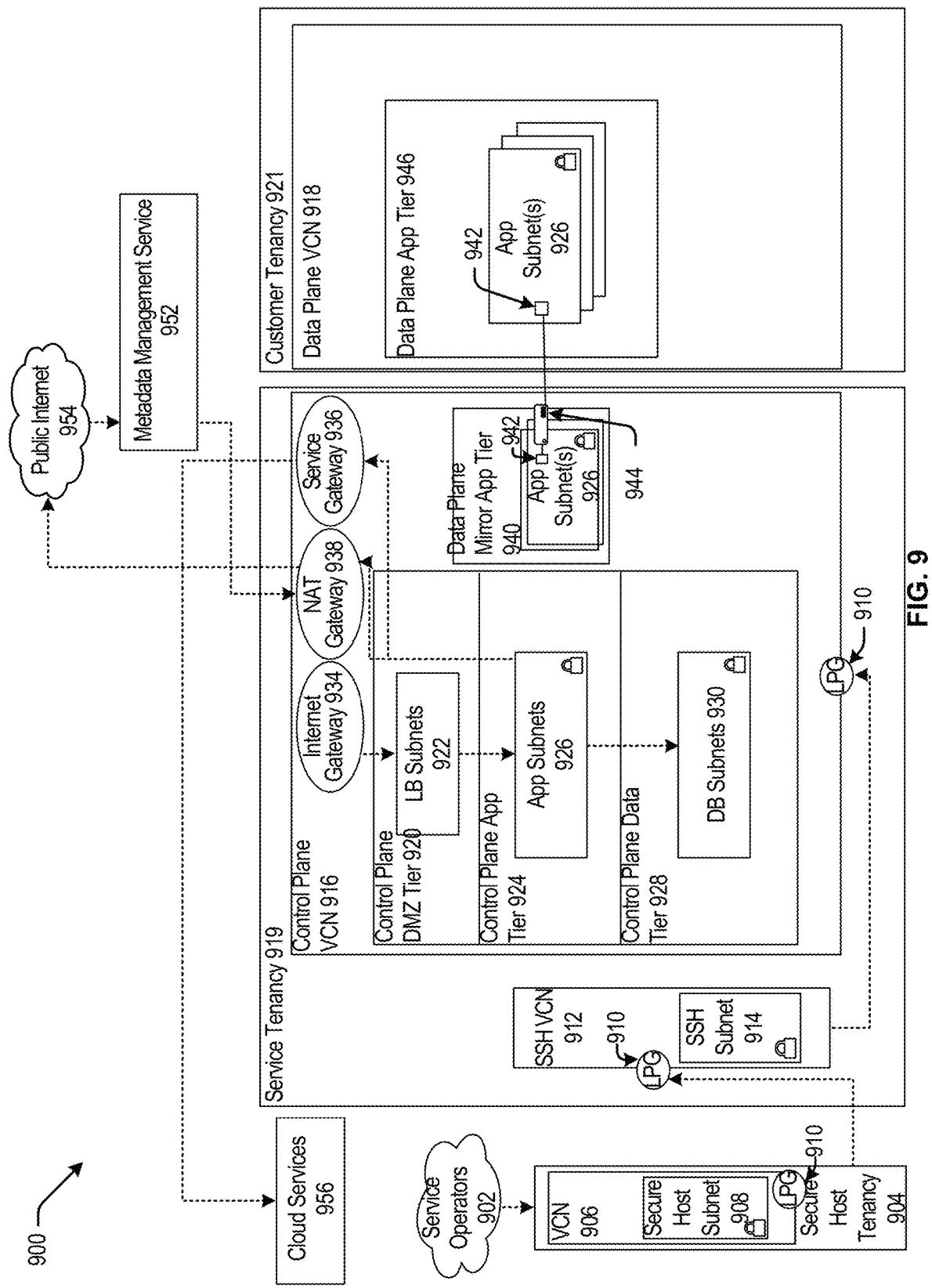
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918, but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
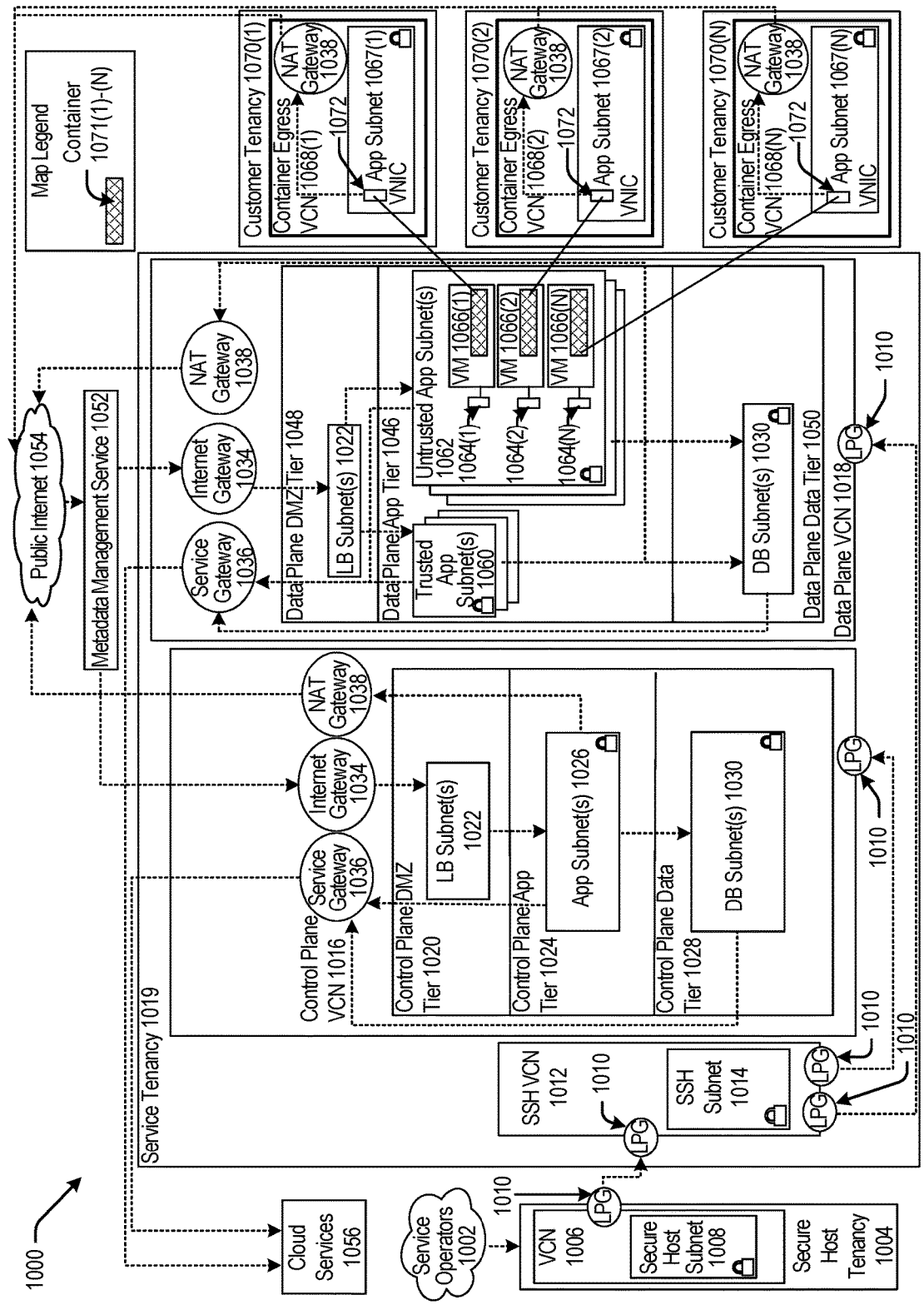
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
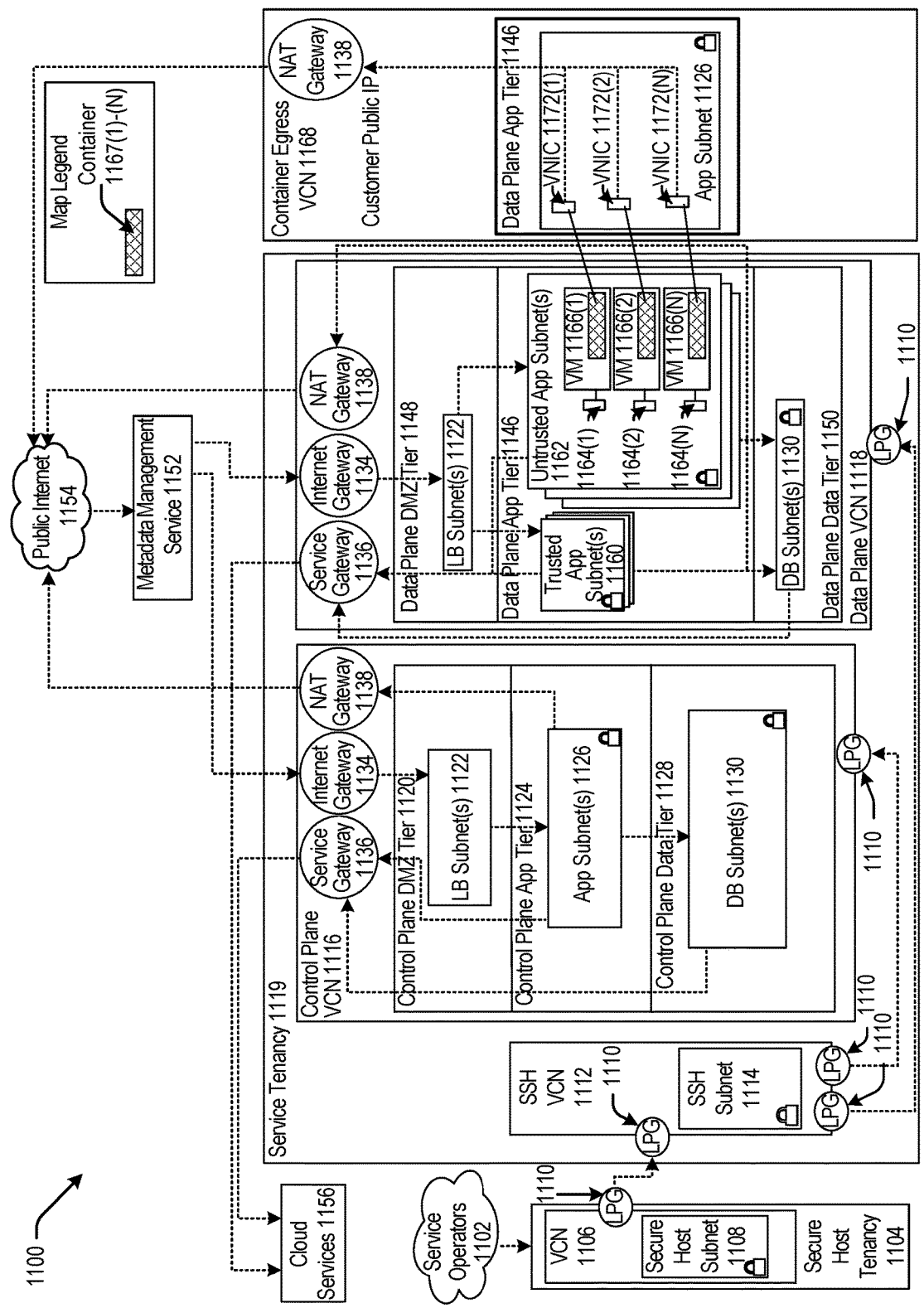
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
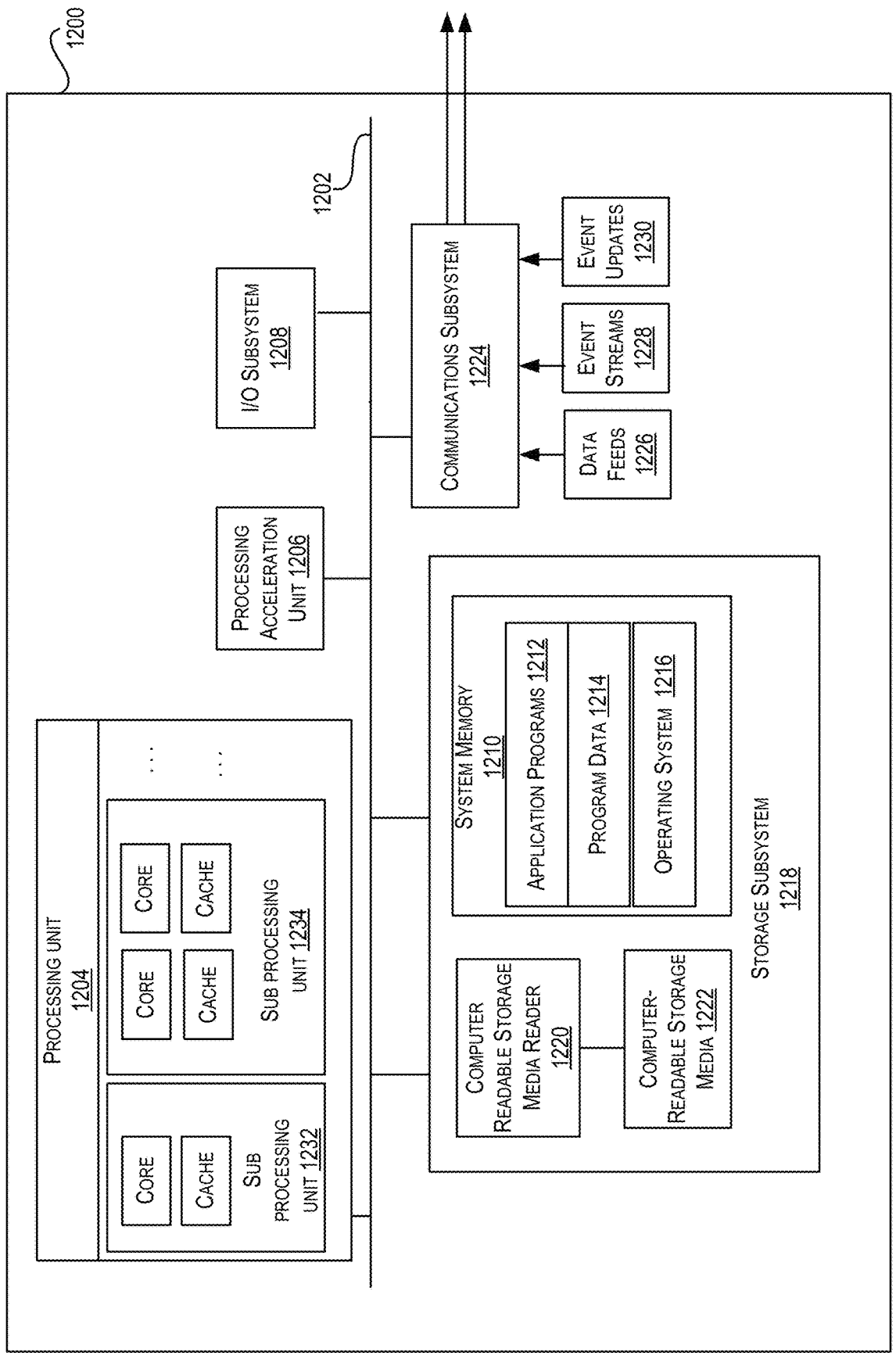
FIG. 12 is a block diagram illustrating an example computer system, according to at least one embodiment.

FIG. 12 illustrates an example computer system 1200, that may be used to implement various embodiments. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the claims is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the disclosed embodiments. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the claimed embodiments.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate certain embodiments and does not pose a limitation on the scope of the disclosed techniques. No language in the specification should be construed as indicating any non-claimed element as essential to the practice of the claimed embodiments.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments are described herein, including the best mode known for carrying out the various embodiments. Variations of those preferred embodiments may become apparent to those of ordinary skill in the art upon reading the foregoing description. Those of ordinary skill should be able to employ such variations as appropriate and the described embodiments may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, novel aspects are described with reference to specific embodiments thereof, but those skilled in the art will recognize that the disclosure is not limited thereto. Various features and aspects of the above-described embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:
1. A method comprising:
  receiving, by a configuration helper system (CHS), a request to generate configuration information for a customer premise equipment (CPE) to enable establishment of a communication channel between an on- premise network of the CPE and a network hosted by infrastructure provided by a cloud services provider, wherein the on-premise network comprises a plurality of CPEs comprising the CPE, wherein the communication channel is configured for at least one of a plurality of different communication protocols, wherein a plurality of communication channels are established between the on-premise network and a plurality of headends of the network hosted by the infrastructure provided by the cloud services provider, wherein the plurality of different communication protocols established between the on-premise network of the customer premise equipment and the infrastructure provided by the cloud service provider comprises a virtual private network;

responsive to the request, searching, by the configuration helper system, a data store for a set of parameters to be included in the configuration information to be generated for the CPE, wherein the set of parameters to be included in the configuration information is based at least in part on one or more characteristics of the communication channel being established, and wherein the set of parameters to be included in the configuration information is based at least in part on one or more characteristics of the infrastructure provided by the cloud services provider;

identifying, by the configuration helper system, from the data store and based upon information included in the request identifying the CPE, the set of parameters to be included in the configuration information to be generated for the CPE;

determining, by the configuration helper system, a set of values for the set of parameters, wherein determining the set of values comprises:

identifying, by the configuration helper system, a subset of parameters from the set of parameters to be included in the configuration information to be generated for the CPE;

communicating, from the configuration helper system to a first system that includes a console system, information identifying the subset of parameters, wherein the first system is different from the configuration helper system, wherein the console system comprises an interface configured to display information identifying the subset of parameters to be included in the configuration information to be provided to the CPE; and receiving, by the configuration helper system from the first system that includes the console system, a set of one or more values for one or more parameters in the subset of parameters, wherein the set of one or more values for the one or more parameters in the subset of parameters is received via a user input on the console system of the first system, wherein a helper element of the console system guides a user regarding selecting the one or more values for the one or more parameters to be included in the configuration information;

determining, by the configuration helper system, a format specific to the CPE; and generating, automatically by the configuration helper system, a configuration file including the configuration information for the CPE in the format specific to the CPE, wherein the generated configuration information comprises the set of parameters and the set of values determined for the set of parameters.

2. The method of claim 1, further comprising:
communicating the configuration information from the configuration helper system to the first system.

3. The method of claim 1, further comprising:
communicating the configuration information from the configuration helper system to the on-premise network.

4. The method of claim 1, further comprising:
communicating the configuration information from the configuration helper system to the on-premise network; and
applying the configuration information to the CPE.

5. The method of claim 1, further comprising:
determining additional information to be included in the configuration information to be generated for the CPE, wherein the additional information includes one or more commands to be executed at the CPE; and
wherein generating the configuration information comprises including the additional information in the generated configuration information.

6. The method of claim 5, wherein the additional information includes an explanation related to the configuration information.

7. The method of claim 1, further comprising:
determining, by the configuration helper system, a first value for a first parameter in the set of parameters; and
communicating, from the configuration helper system to the first system, the first value determined for the first parameter.

8. The method of claim 7, wherein:
the on-premise network is a network of a customer; and
determining the first value for the first parameter comprises, determining, by the configuration helper system, the first value based upon preferences information for the customer.

9. The method of claim 7, wherein:
determining the first value for the first parameter comprises, determining, by the configuration helper system, the first value based upon a prior value set for the first parameter.

10. The method of claim 7, wherein:
receiving the set of one or more values for the one or more parameters in the set of parameters comprises receiving a second value for the first parameter, wherein the second value is different from the first value; and
generating the configuration information comprises including the second value for the first parameter in the generated configuration information.

11. The method of claim 1, wherein:
the information included in the request comprises information identifying the communication channel;
the information identifying the CPE comprises at least one of information identifying a vendor of the CPE, information identifying a version of the CPE, or information identifying a platform of the CPE; and
identifying the set of parameters to be included in the configuration information to be generated for the CPE comprises determining the set of parameters based upon the information identifying the communication channel and information identifying the CPE.

12. A computing device comprising:
a processor; and
a memory including instructions that, when executed by the processor, cause the computing device to perform processing comprising:
receiving, by a configuration helper system (CHS), a request to generate configuration information for a customer premise equipment (CPE) to enable establishment of a communication channel between an on-premise network of the CPE and a network hosted by infrastructure provided by a cloud services provider, wherein the on-premise network comprises a plurality of CPEs comprising the CPE, wherein the communication channel is configured for at least one of a plurality of different communication protocols, wherein a plurality of communication channels are established between the on-premise network and a plurality of headends of the network hosted by the infrastructure provided by the cloud services provider, wherein the plurality of different communication protocols established between the on-premise network of the customer premise equipment and the infrastructure provided by the cloud service provider comprises a virtual private network;

responsive to the request, searching, by the configuration helper system, a data store for a set of parameters to be included in the configuration information to be generated for the CPE, wherein the set of parameters to be included in the configuration information is based at least in part on one or more characteristics of the communication channel being established, and wherein the set of parameters to be included in the configuration information is based at least in part on one or more characteristics of the infrastructure provided by the cloud services provider;

identifying, from the data store and based upon information included in the request identifying the CPE, the set of parameters to be included in the configuration information to be generated for the CPE;

determining, by the configuration helper system, a set of values for the set of parameters, wherein determining the set of values comprises:

identifying, by the configuration helper system, a subset of parameters from the set of parameters to be included in the configuration information to be generated for the CPE;

communicating, from the configuration helper system to a first system that includes a console system, information identifying the subset of parameters, wherein the console system comprises an interface configured to display information identifying the subset of parameters to be included in the configuration information to be provided to the CPE; and receiving, by the configuration helper system (CHS) from the first system that includes the console system, a set of one or more values for one or more parameters in the subset of parameters, wherein the set of one or more values for the one or more parameters is received via a user input on the console system of the first system, wherein a helper element of the console system guides a user regarding selecting the one or more values for the one or more parameters to be included in the configuration information;

determining, by the configuration helper system, a format specific to the CPE; and automatically generating, by the configuration helper system, a configuration file including the configuration information for the CPE in the format specific to the CPE, wherein the generated configuration information comprises the set of parameters and the set of values determined for the set of parameters.

13. The computing device of claim 12, wherein the processing further comprises:

communicating the configuration information from the configuration helper system to the on-premise network for application of the configuration information to the CPE, wherein the configuration helper system is configured to generate configuration information that is customized for the CPE and the communication channel.

14. The computing device of claim 12, wherein the processing further comprises:

determining additional information to be included in the configuration information to be generated for the CPE, wherein the additional information includes one or more commands to be executed at the CPE; and wherein generating the configuration information comprises including the additional information in the generated configuration information.

15. The computing device of claim 12, wherein the processing further comprises:

determining a first value for a first parameter in the set of parameters; and communicating the first value determined for the first parameter to the first system.

16. The computing device of claim 15, wherein determining the first value for the first parameter comprises:

determining the first value based upon preferences information for a customer of the cloud services provider, or determining the first value based upon a prior value set for the first parameter.

17. The computing device of claim 15, wherein:

receiving the set of one or more values for the one or more parameters in the set of parameters comprises receiving a second value for the first parameter, wherein the second value is different from the first value; and generating the configuration information comprises including the second value for the first parameter in the generated configuration information.

18. The computing device of claim 12, wherein:

the information included in the request comprises information identifying the communication channel;

the information identifying the CPE comprises at least one of information identifying a vendor of the CPE, information identifying a version of the CPE, or information identifying a platform of the CPE; and identifying the set of parameters to be included in the configuration information to be generated for the CPE comprises determining the set of parameters based upon the information identifying the communication channel and information identifying the CPE.

19. A non-transitory computer readable medium storing a plurality of instructions executable by one or more processors, and when executed by the one or more processors cause the one or more processors to perform processing comprising:

receiving, by a configuration helper system (CHS), a request to generate configuration information for a customer premise equipment (CPE) to enable establishment of a communication channel between an on-premise network of the CPE and a network hosted by infrastructure provided by a cloud services provider, wherein the on-premise network comprises a plurality of CPEs comprising the CPE, wherein the communication channel is configured for at least one of a plurality of different communication protocols, wherein a plurality of communication channels are established between the on-premise network and a plurality of headends of the network hosted by the infrastructure provided by the cloud services provider, wherein the plurality of different communication protocols established between the on-premise network of the customer premise equipment and the infrastructure provided by the cloud service provider comprises a virtual private network;

responsive to the request, searching, by the configuration helper system, a data store for a set of parameters to be included in the configuration information to be generated for the CPE, wherein the set of parameters to be included in the configuration information is based at least in part on one or more characteristics of the communication channel being established, and wherein the set of parameters to be included in the configuration information is based at least in part on one or more characteristics of the infrastructure provided by the cloud services provider;

identifying, by the configuration helper system, from the data store and based upon information included in the request identifying the CPE, the set of parameters to be included in the configuration information to be generated for the CPE, determining, by the configuration helper system, a set of values for the set of parameters, wherein determining the set of values comprises:
- identifying, by the configuration helper system, a subset of parameters from the set of parameters to be included in the configuration information to be generated for the CPE;
- communicating, from the configuration helper system to a first system that includes a console system, information identifying the subset of parameters, wherein the console system comprises an interface configured to display the information identifying the subset of para meters to be included in the configuration information to be provided to the CPE; and
- receiving, by the configuration helper system from the first system that includes the console system, a set of one or more values for one or more parameters in the subset of parameters, wherein the set of one or more values for the one or more parameters is received via a user input on the console system of the first system, wherein a helper element of the console system guides a user regarding selecting the one or more values for the one or more parameters to be included in the configuration information;

determining, by the configuration helper system, a format specific to the CPE; and generating automatically, by the configuration helper system, a configuration file including the configuration information for the CPE in the format specific to the CPE, wherein the generated configuration information comprises the set of parameters and the set of values determined for the set of parameters.

* * * * *

UNITED STATES PATENT AND TRADEMARK OFFICE
CERTIFICATE OF CORRECTION

PATENT NO. : 11,831,508 B2
APPLICATION NO. : 17/107422
DATED : November 28, 2023
INVENTOR(S) : Hill et al.

It is certified that error appears in the above-identified patent and that said Letters Patent is hereby corrected as shown below:

In the Specification

In Columns 21-22, Line 9, after "SETTING" delete "THE".

In Columns 21-22, Line 52, delete "hour) ." and insert -- hour). --, therefor.

In Columns 21-22, Line 76, delete ".bumbop" and insert -- .bimbop --, therefor.

In the Claims

In Column 39, Line 18, in Claim 1, delete "para meters" and insert -- parameters --, therefor.

In Column 39, Line 30, in Claim 1, delete "para meters" and insert -- parameters --, therefor.

In Column 39, Line 37, in Claim 1, delete "para meters" and insert -- parameters --, therefor.

In Column 39, Line 46, in Claim 1, delete "para meters" and insert -- parameters --, therefor.

In Column 39, Line 58, in Claim 1, delete "para meters" and insert -- parameters --, therefor.

In Column 40, Line 55, in Claim 11, delete "para meters" and insert -- parameters --, therefor.

In Column 41, Lines 55-56, in Claim 12, delete "para meters" and insert -- parameters --, therefor.

In Column 42, Line 45, in Claim 18, delete "para meters" and insert -- parameters --, therefor.

Signed and Sealed this
Eleventh Day of June, 2024

Katherine Kelly Vidal
*Director of the United States Patent and Trademark Office*